(12) United States Patent
Shen et al.

(10) Patent No.: US 12,449,386 B2
(45) Date of Patent: Oct. 21, 2025

(54) FORWARD LIBRARY BASED SEEDING FOR EFFICIENT X-RAY SCATTEROMETRY MEASUREMENTS

(71) Applicant: KLA Corporation, Milpitas, CA (US)

(72) Inventors: Rebecca Shen, Santa Clara, CA (US); Naga Venkata Lakshmi Sandeep Inampudi, Westford, MA (US); Boxue Chen, San Jose, CA (US); Bindi Nagda, Melbourne, FL (US); John J. Hench, Los Gatos, CA (US); William McGahan, Spicewood, TX (US)

(73) Assignee: KLA Corporation, Milpitas, CA (US)

( * ) Notice: Subject to any disclaimer, the term of this patent is extended or adjusted under 35 U.S.C. 154(b) by 103 days.

(21) Appl. No.: 18/367,364

(22) Filed: Sep. 12, 2023

(65) Prior Publication Data

US 2025/0085241 A1 Mar. 13, 2025

(51) Int. Cl.
*G01N 23/2055* (2018.01)
*G01N 23/201* (2018.01)

(52) U.S. Cl.
CPC ....... *G01N 23/201* (2013.01); *G01N 23/2055* (2013.01); *G01N 2223/03* (2013.01);
(Continued)

(58) Field of Classification Search
CPC ............. G01N 23/201; G01N 23/2055; G01N 2223/03; G01N 2223/054;
(Continued)

(56) References Cited

U.S. PATENT DOCUMENTS 5,608,526 A 3/1997 Piwonka-Corle et al.
5,859,424 A 1/1999 Norton et al.
(Continued)

FOREIGN PATENT DOCUMENTS

CN 102650832 A 8/2012
JP 2008098636 A 4/2008

OTHER PUBLICATIONS

International Search Report mailed on Dec. 10, 2024, for PCT Application No. PCT/US2024/045071 filed on Sep. 4, 2024, by KLA Corporation, 3 pages.
(Continued)

*Primary Examiner* — David P Porta
*Assistant Examiner* — Mamadou Faye
(74) *Attorney, Agent, or Firm* — HUSE IP Law

(57) ABSTRACT

Methods and systems for performing X-ray model based scatterometry measurements of semiconductor structures with reduced computational effort are described herein. More specifically, measured detector image data is transformed to diffraction order efficiency data. The measured diffraction order efficiency data is compared with a parameter-efficiency library including simulated diffraction order efficiency data and associated sets of specimen parameter values. One or more sets of specimen parameter values are selected as seed values for regression on the measured detector image data based on the fit between the measured and simulated diffraction order efficiency data. The seed values are provided as initial values of one or more parameters of interest for the first iteration of the regression. The seed values enable the image based regression to converge to the global minimum with a dramatically reduced number of iterations. Thus, accurate X-ray scatterometry measurements of complex semiconductor structures are realized with less computational effort.

20 Claims, 11 Drawing Sheets

(52) U.S. Cl.
CPC .............. *G01N 2223/054* (2013.01); *G01N 2223/0566* (2013.01); *G01N 2223/1016* (2013.01); *G01N 2223/6116* (2013.01)

(58) Field of Classification Search
CPC ... G01N 2223/0566; G01N 2223/1016; G01N 2223/6116
See application file for complete search history.

(56) References Cited

U.S. PATENT DOCUMENTS

| | | |
|---|---|---|
| 5,867,276 A | 2/1999 | McNeil et al. |
| 6,023,338 A | 2/2000 | Bareket |
| 6,429,943 B1 | 8/2002 | Opsal et al. |
| 6,716,646 B1 | 4/2004 | Wright et al. |
| 6,747,734 B1 | 6/2004 | Ritzdorf et al. |
| 6,768,983 B1 | 7/2004 | Jakatdar et al. |
| 6,778,275 B2 | 8/2004 | Bowes |
| 6,787,773 B1 | 9/2004 | Lee |
| 6,931,361 B2 | 8/2005 | Opsal et al. |
| 6,989,900 B1 | 1/2006 | Stirton |
| 6,992,764 B1 | 1/2006 | Yang et al. |
| 7,242,477 B2 | 7/2007 | Mieher et al. |
| 7,321,426 B1 | 1/2008 | Poslavsky et al. |
| 7,406,153 B2 | 7/2008 | Berman |
| 7,478,019 B2 | 1/2009 | Zangooie et al. |
| 7,626,702 B2 | 12/2009 | Ausschnitt et al. |
| 7,656,528 B2 | 2/2010 | Abdulhalim et al. |
| 7,826,071 B2 | 11/2010 | Shchegrov et al. |
| 7,842,933 B2 | 11/2010 | Shur et al. |
| 7,873,585 B2 | 1/2011 | Izikson |
| 7,929,667 B1 | 4/2011 | Zhuang et al. |
| 7,933,026 B2 | 4/2011 | Opsal et al. |
| 8,068,662 B2 | 11/2011 | Zhang et al. |
| 8,138,498 B2 | 3/2012 | Ghinovker |
| 8,502,979 B2 | 8/2013 | Levy et al. |
| 9,291,554 B2 | 3/2016 | Kuznetsov et al. |
| 9,826,614 B1 | 11/2017 | Bakeman et al. |
| 9,857,291 B2 | 1/2018 | Kwak et al. |
| 9,885,962 B2 | 2/2018 | Veldman et al. |
| 9,915,522 B1 | 3/2018 | Jiang et al. |
| 10,006,865 B1 | 6/2018 | Shaughnessy et al. |
| 10,013,518 B2 | 7/2018 | Bakeman et al. |
| 10,101,670 B2 | 10/2018 | Pandev et al. |
| 10,152,678 B2 | 12/2018 | Pandev et al. |
| 10,324,050 B2 | 6/2019 | Hench et al. |
| 10,352,695 B2 | 7/2019 | Dziura et al. |
| 10,393,647 B1 | 8/2019 | Zhao et al. |
| 10,545,104 B2 | 1/2020 | Hench et al. |
| 10,605,722 B2 | 3/2020 | Kwak et al. |
| 10,775,323 B2 | 9/2020 | Gellineau et al. |
| 11,678,803 B1 | 6/2023 | Nitsche |
| 2003/0021465 A1 | 1/2003 | Adel et al. |
| 2004/0073398 A1 | 4/2004 | Nikoonahad et al. |
| 2007/0176128 A1 | 8/2007 | Van Bilsen et al. |
| 2007/0221842 A1 | 9/2007 | Morokuma et al. |
| 2008/0088832 A1 | 4/2008 | Cramer et al. |
| 2009/0152463 A1 | 6/2009 | Toyoda et al. |
| 2011/0266440 A1 | 11/2011 | Boughorbel et al. |
| 2012/0218533 A1 | 8/2012 | Lyulina et al. |
| 2012/0292502 A1 | 11/2012 | Langer et al. |
| 2013/0208279 A1 | 8/2013 | Smith |
| 2013/0304424 A1 | 11/2013 | Bakeman et al. |
| 2014/0019097 A1 | 1/2014 | Bakeman et al. |
| 2014/0064445 A1 | 3/2014 | Adler |
| 2014/0111791 A1 | 4/2014 | Manassen et al. |
| 2014/0172394 A1 | 6/2014 | Kuznetsov et al. |
| 2014/0222380 A1 | 8/2014 | Kuznetsov et al. |
| 2014/0297211 A1 | 10/2014 | Pandev et al. |
| 2015/0046121 A1 | 2/2015 | Dziura et al. |
| 2015/0110249 A1 | 4/2015 | Bakeman et al. |
| 2015/0117610 A1 | 4/2015 | Veldman et al. |
| 2015/0204664 A1 | 7/2015 | Bringoltz et al. |
| 2015/0285749 A1 | 10/2015 | Moncton et al. |
| 2015/0300965 A1 | 10/2015 | Sezginer et al. |
| 2016/0202193 A1 | 7/2016 | Hench et al. |
| 2016/0320319 A1 | 11/2016 | Hench et al. |
| 2017/0167862 A1 | 6/2017 | Dziura et al. |
| 2018/0106735 A1 | 4/2018 | Gellineau et al. |
| 2018/0113084 A1 | 4/2018 | Hench et al. |
| 2018/0328868 A1 | 11/2018 | Bykanov et al. |
| 2019/0017946 A1 | 1/2019 | Wack et al. |
| 2019/0293578 A1 | 9/2019 | Gellineau |
| 2020/0175354 A1 | 6/2020 | Volodarskiy et al. |
| 2020/0300790 A1 | 9/2020 | Gellineau et al. |
| 2021/0097665 A1 | 4/2021 | Chuang et al. |
| 2021/0165398 A1* | 6/2021 | Pandev ............ G05B 19/41875 |
| 2021/0207956 A1 | 7/2021 | Shchegrov et al. |
| 2021/0341397 A1 | 11/2021 | Ginsburg et al. |
| 2023/0131024 A1 | 4/2023 | Le |

OTHER PUBLICATIONS

Lemaillet, Germer, Kline et al.,"Intercomparison between optical and x-ray scatterometry measurements of FinFET structures" by Proc. SPIE, v.8681, p. 86810Q (2013).

Kline et al., "X-ray scattering critical dimensional metrology using a compact x-ray source for next generation semiconductor devices," J. Micro/Nanolith. MEMS MOEMS 16(1), 014001 (Jan.-Mar. 2017).

Catalucci, Sofia et al., "Smart optical coordinate and surface metrology," Meas. Sci. Technol. 34 (2023) 012001.

* cited by examiner

FORWARD LIBRARY BASED SEEDING FOR EFFICIENT X-RAY SCATTEROMETRY MEASUREMENTS

TECHNICAL FIELD

The described embodiments relate to metrology systems and methods, and more particularly to methods and systems for improved measurement of semiconductor structures.

BACKGROUND INFORMATION

Semiconductor devices such as logic and memory devices are typically fabricated by a sequence of processing steps applied to a specimen. The various features and multiple structural levels of the semiconductor devices are formed by these processing steps. For example, lithography among others is one semiconductor fabrication process that involves generating a pattern on a semiconductor wafer. Additional examples of semiconductor fabrication processes include, but are not limited to, chemical-mechanical polishing, etch, deposition, and ion implantation. Multiple semiconductor devices may be fabricated on a single semiconductor wafer and then separated into individual semiconductor devices.

Metrology processes are used at various steps during a semiconductor manufacturing process to detect defects on wafers to promote higher yield. A number of metrology based techniques including scatterometry and reflectometry implementations and associated analysis algorithms are commonly used to characterize critical dimensions, film thicknesses, composition and other parameters of nanoscale structures.

Traditionally, scatterometry critical dimension (SCD) measurements are performed on targets consisting of thin films and/or repeated periodic structures. During device fabrication, these films and periodic structures typically represent the actual device geometry and material structure or an intermediate design. As devices (e.g., logic and memory devices) move toward smaller nanometer-scale dimensions, characterization becomes more difficult. Devices incorporating complex three-dimensional geometry and materials with diverse physical properties contribute to characterization difficulty. For example, modern memory structures are often high-aspect ratio, three-dimensional structures that make it difficult for optical radiation to penetrate to the bottom layers. Optical metrology tools utilizing infrared to visible light can penetrate many layers of translucent materials, but longer wavelengths that provide good depth of penetration do not provide sufficient sensitivity to small anomalies. In addition, the increasing number of parameters required to characterize complex structures (e.g., FinFETs), leads to increasing parameter correlation. As a result, the parameters characterizing the target often cannot be reliably decoupled.

In one example, longer wavelengths (e.g. near infrared) have been employed in an attempt to overcome penetration issues for 3D FLASH devices that utilize polysilicon as one of the alternating materials in the stack. However, the mirror like structure of 3D FLASH intrinsically causes decreasing light intensity as the illumination propagates deeper into the film stack. This causes sensitivity loss and correlation issues at depth. In this scenario, SCD is only able to successfully extract a reduced set of metrology dimensions with high sensitivity and low correlation.

In another example, opaque, high-k materials are increasingly employed in modern semiconductor structures. Optical radiation is often unable to penetrate layers constructed of these materials. As a result, measurements with thin-film scatterometry tools such as ellipsometers or reflectometers are becoming increasingly challenging.

In response to these challenges, more complex optical metrology tools have been developed. For example, tools with multiple angles of illumination, shorter illumination wavelengths, broader ranges of illumination wavelengths, and more complete information acquisition from reflected signals (e.g., measuring multiple Mueller matrix elements in addition to the more conventional reflectivity or ellipsometric signals) have been developed. In addition, X-Ray scatterometry systems, such as transmission, small angle x-ray scatterometry (T-SAXS) systems, have shown promise to address challenging measurement applications. These X-Ray based scatterometry systems also feature large ranges of illumination angles, broad ranges of illumination wavelengths, etc. Although state of the art optical and X-ray scatterometry systems enable challenging measurement applications, the computational effort required to estimate values of parameters of interest has emerged as a limiting performance issue.

Many metrology techniques, including X-ray based scatterometry, are indirect methods of measuring physical properties of a specimen under measurement. In most cases, the raw measurement signals, e.g., measured images at the detector, cannot be used to directly determine the physical properties of the specimen. Instead, a measurement model or a pre-computed library of model solutions is employed to estimate the values of one or more parameters of interest based on the raw measurement signals. For example, scatterometry is an indirect method of measuring physical properties of the specimen under measurement. In general, a physics-based measurement model or a machine learning based measurement model is employed to determine the physical properties of the specimen based on the raw measurement signals.

In some examples, a physics-based measurement model is created that attempts to predict the raw measurement signals based on assumed values of one or more model parameters. The physics-based measurement model includes parameters associated with the metrology tool itself, e.g., machine parameters, and parameters characterizing the specimen under measurement. Machine parameters are parameters used to characterize the metrology tool. Exemplary machine parameters include angle of incidence (AOI), azimuth angle (Az), beam flux, beam divergence, etc. Specimen parameters are parameters used to characterize the specimen (e.g., material and geometric parameters characterizing the structure(s) under measurement). For a CD specimen, exemplary specimen parameters include geometric parameter values associated with different layers, refractive indices associated with different layers, etc. For measurement purposes, the machine parameters and many of the specimen parameters are treated as known, fixed valued parameters, and the values of one or more specimen parameters of interest are treated as unknown, floating parameter values.

In some examples, the values of the floating parameters of interest are resolved by an iterative process (e.g., regression) that produces the best fit between theoretical predictions and experimental data. The values of the unknown, floating parameters of interest are varied and the model output values, e.g., simulated pixelated images, are calculated and compared to the measured images in an iterative manner until a set of specimen parameter values are determined that results in a sufficiently close match between the model output values, e.g., simulated images, and the experimentally measured values, e.g., measured images. The process of matching typically involves the use of a regression engine, that adjusts parametric values that determine the shape and composition of the model until a suitable cost function related to the difference between measured and simulated images is minimized. In some other examples, the floating parameters are resolved by a search through a library of pre-computed solutions to find the closest match.

Directly employing regression on detector images, i.e., regression in image space, to estimate values of one or more parameters of interest characterizing a structure under measurement has proven successful. However, the computational cost associated with regression in image space is a serious disadvantage. Typical memory structures are large periodic structures having a height of several micrometers. Thus, the number of parameters employed to characterize complex structures is very large. For this reason, the computational effort required to construct geometric models associated with a given parameter set as well as calculate images at the detector is limiting. Furthermore, most regression engines require the calculation of parametric derivatives of the images, which is computationally intensive. In addition, the cost surface associated with regression in image space is complex due to the complexity of the modeled semiconductor structure. Thus, the cost surface often includes many local minima.

The seed values of a regression in image space are the assumed set of values of the floating parameters characterizing the structure employed in the first iteration of the regression. Not surprisingly, the closer the seed values are to the global minimum, the fewer the number of iterations required for the regression to converge and the greater the likelihood that the regression converges at the global minimum. In this manner, judicious selection of seed values of the regression parameters can reduce the computational burden of regression in image space and increase the accuracy of the measurement result.

Several different approaches to the selection of seed values of regression parameters in image space have been proposed, but each approach suffers from significant limitations.

In one example, nominal values of the floating parameters characterizing the structure under measurement are employed as the seed values. The nominal values are typically defined as the midpoint of the perceived process range of possible values of each parameter. Although, it is relatively straightforward to determine seed values in this manner, regression seeded by nominal values typically converges to local minima for complex structures under measurement.

In another example, seed values of the floating parameters are selected by a nearest neighbor search within a pre-generated image-parameter database. In this approach, a forward measurement model is employed to compute the expected image at the detector associated with a measurement of a structure with assumed values of the parameters characterizing the structure under measurement. Many different combinations of parameter values and the associated images are simulated and stored in a database. The difference between an incoming measured image and each of the pre-generated images is computed, and the pre-generated images are ranked from the smallest difference to the largest. The parameter values associated with the top ranked pre-generated image is selected as seed values for regression in image space. In some examples, multiple regression instances are initiated, each seeded by a different parameter set selected from the top ranked parameter sets. Each regression instance is run to convergence and the results are compared to select the best measurement result.

Unfortunately, regression in image space for X-Ray scatterometry applications is very time consuming. In most cases, the required system throughput allows only enough time for one iteration of the regression to converge to a solution. Under this constraint, a nearest neighbor search within a pre-generated image-parameter database can only be successful if the database is extremely dense in parameter space such that the top ranked parameter set employed to seed the regression resides in the basin that contains the global minima. Unfortunately, a database having sufficient density would be unmanageable due to the extremely high dimensionality required.

In another example, a machine learning based model is trained to predict seed values of a regression in image space based on an incoming measured image. However, in a typical measurement application, hundreds of thousands of images are simulated to train the machine learning based model. Thus, the computational effort required to train a machine learning based measurement model can be excessive as model complexity increases. Furthermore, a trained machine learning based model often suffers from robustness and accuracy issues, particularly for complex measurement targets. In particular, some variations of parameter values result in similar images, and the trained machine learning based measurement model is unable to distinguish these parameter values. Thus, in practice, this approach has met with limited success.

Future metrology applications present challenges for metrology due to increasingly small resolution requirements, multi-parameter correlation, increasingly complex geometric structures, and increasing use of opaque materials. Thus, methods and systems for performing model based regression accurately and in a computationally efficient manner are desired.

SUMMARY

Methods and systems for performing X-ray model based scatterometry measurements of semiconductor structures with reduced computational effort are described herein. More specifically, measured detector image data is transformed to diffraction order efficiency data. The measured diffraction order efficiency data is compared with a parameter-efficiency library including simulated diffraction order efficiency data and associated sets of specimen parameter values. One or more sets of specimen parameter values are selected as seed values for regression on the measured detector image data based on the fit between the measured and simulated diffraction order efficiency data. Values of one or more parameters of interest (e.g., critical dimension, sidewall angle, height, overlay, etc.) are determined by an inverse solution of a detector image based measurement model. Seed values of the one or more parameters of interest are provided as initial values of the one or more parameters of interest for the first iteration of the regression. The seed values enable the image based regression to converge to the global minimum with a dramatically reduced number of iterations. In this manner, accurate X-ray scatterometry measurements of complex semiconductor structures are realized with less computational effort.

In one aspect, a measurement transformation module transforms a measured image, i.e., measured photon counts on a detector grid, into a set of estimated diffraction order efficiency values. In some embodiments, a linear model is employed to compute order efficiency values from each scattering image. This approach is based on the notion that the scaling of the photon counts in the image domain is approximately equal to the scaling of efficiencies in the diffraction orders domain. In some other embodiments, a trained machine learning based model is employed to compute order efficiency values from each measured scattering image. In this manner, the trained machine learning based model transforms measured photon counts on the detector grid into a diffraction efficiency associated with each scattering order. In some embodiments, diffraction order efficiency values are determined from each scattering image using a combination of a trained machine learning based model and a linear model.

In a further aspect, values indicative of a signal to noise ratio associated with each of the set of diffraction order efficiency values are estimated and the set of diffraction order efficiency values are filtered based on the estimated values indicative of the signal to noise ratio.

In another aspect, a value of an error metric characterizing a difference between each of a plurality of sets of simulated diffraction order efficiency values and the set of estimated diffraction order efficiency values is determined. In general, an error metric value can be derived from a single error metric function or a combination of multiple, different error metric functions.

A pre-computed parameter-efficiency library includes different sets of specimen parameter values designed to span the process space of the structure under measurement, and corresponding sets of diffraction order efficiency values associated with a measurement of a structure characterized by assumed values of the specimen parameters. In some examples, the pre-computed parameter-efficiency library module includes thousands of different parameter-efficiency pairs.

An error metric value characterizes a difference between the diffraction order efficiency values and each set of simulated efficiency values. In this manner, an error metric value quantifies the difference between measured data and simulated measurement data in efficiency space. Furthermore, the difference between measured data and simulated measurement data in efficiency space is quantified for geometric profiles that span the process space of the structure under measurement. By operating in efficiency space, the computational burden associated with exploring the differences throughout the process space is significantly reduced in comparison to performing the differences in image space.

In some examples, an error metric function includes a regularization term. In some examples, an error function includes a variance term associated with repeated measurement instances, i.e., repeated measurements of the same structure. In some examples, an error function includes a smoothness term associated with measurement instances at different locations across the wafer surface.

In a further aspect, one or more sets of specimen parameter values as candidate sets of seed parameter values are selected based on the value of the error metric associated with each of the corresponding parameter-efficiency pairs.

In some examples, the values of the error metric associated with j parameter-efficiency pairs under consideration are ranked in increasing order, and the parameter-efficiency pairs associated with the N top ranked pairs, i.e., parameter-efficiency pairs having the N lowest values error metric values, are selected as candidate sets of seed parameter values. In some examples, a nearest neighbor search through the parameter-efficiency library is performed to find the top N ranked pairs. In these examples, the j parameter-efficiency pairs are selected from the parameter-efficiency library and evaluated sequentially, i.e., one at a time, rather than in parallel.

In some examples, a clustering algorithm is employed to search through the parameter-efficiency library to find the top N ranked pairs. Again, in these examples, the j parameter-efficiency pairs are selected from the parameter-efficiency library and evaluated sequentially, i.e., one at a time, rather than in parallel. A clustering algorithm ensures that selected candidate sets of seed parameter values are well separated from each other, and thus are more likely to converge to different minima.

In a further aspect, the values of each candidate set of seed parameter values are refined by a regression on diffraction order efficiency values where the candidate seed parameter values are the regression parameters. The regression based refinement further closes the gap between the seed values of the specimen parameters and the global minima. For each candidate parameter-efficiency pair, the candidate set of seed parameter values is employed as the seed values of the regression on the diffraction order efficiency values.

In some examples, the refined candidate sets of seed parameter values are filtered based on the residual errors of the regression employed to refine the seed parameter values.

In some examples, a Euclidean distance between each of the filtered, candidate sets of seed parameter values and the filtered candidate set of seed parameter values associated with the lowest valued error metric is determined. In general, profiles close to the lowest error candidate are likely to also be close to the same minima as the lowest error candidate. Rather than selecting a seed profile that is likely to converge to the same minima, the profile that is furthest away from the lowest error candidate is selected. In this manner, the selected profile is likely to converge to different minima.

In another aspect, the selected sets of seed parameter values are employed as the seed values of a regression on image data. If multiple sets of seed parameter values are explored, the estimated values of the parameters of interest associated with the regression result having the smallest residual error is selected as the measured values of the parameters of interest. In some examples, the residual error is computed using a $Chi^2$ measure of residual error.

In general, forward library based seeding leverages the speed advantage of a pre-computed parameter-efficiency library and performs regression on order efficiencies, rather than images. Forward library based seeding enables regression from nearest neighbors in efficiency space to find the global minimum on the forward library approximated cost surface. This greatly increases the possibility that subsequent image based regression converges to global minima. Furthermore, forward library based seeding offers the possibility of multiple, different sets of seed values that also increases the possibility that subsequent image based regression converges to global minima based on one of the sets of seed values.

In a further aspect, the pre-generated parameter-efficiency library is compressed by a data reduction algorithm such as a principle component analysis (PCA). The compressed library reduces the dimensionality of order efficiencies. Operating in a compressed efficiency space reduces the computational effort associated with searching for candidate parameter-efficiency pairs and regression. By compressing the efficiency space, a broader efficiency space may be utilized.

In another further aspect, order efficiencies are encoded to integers to increase search speed.

In another further aspect, efficiency values of a set of estimated diffraction order efficiency values are weighted differently. In some examples, the weighting factors are derived from a signal to noise ratio associated with each diffraction order. In some other examples, the weighting factors are based on sensitivity to values of critical parameters. In some other examples, the weighting factors are based on the accuracy of the transformation of the measured image to diffraction order efficiencies.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

DETAILED DESCRIPTION

Reference will now be made in detail to background examples and some embodiments of the invention, examples of which are illustrated in the accompanying drawings.

Methods and systems for performing X-ray model based scatterometry measurements of semiconductor structures with reduced computational effort are described herein. More specifically, measured detector image data is transformed to diffraction order efficiency data. The measured diffraction order efficiency data is compared with a parameter-efficiency library including simulated diffraction order efficiency data and associated sets of specimen parameter values. One or more sets of specimen parameter values are selected as seed values for regression on the measured detector image data based on the fit between the measured and simulated diffraction order efficiency data. In this manner, accurate X-ray scatterometry measurements of complex semiconductor structures are realized with less computational effort.

Figure 1:
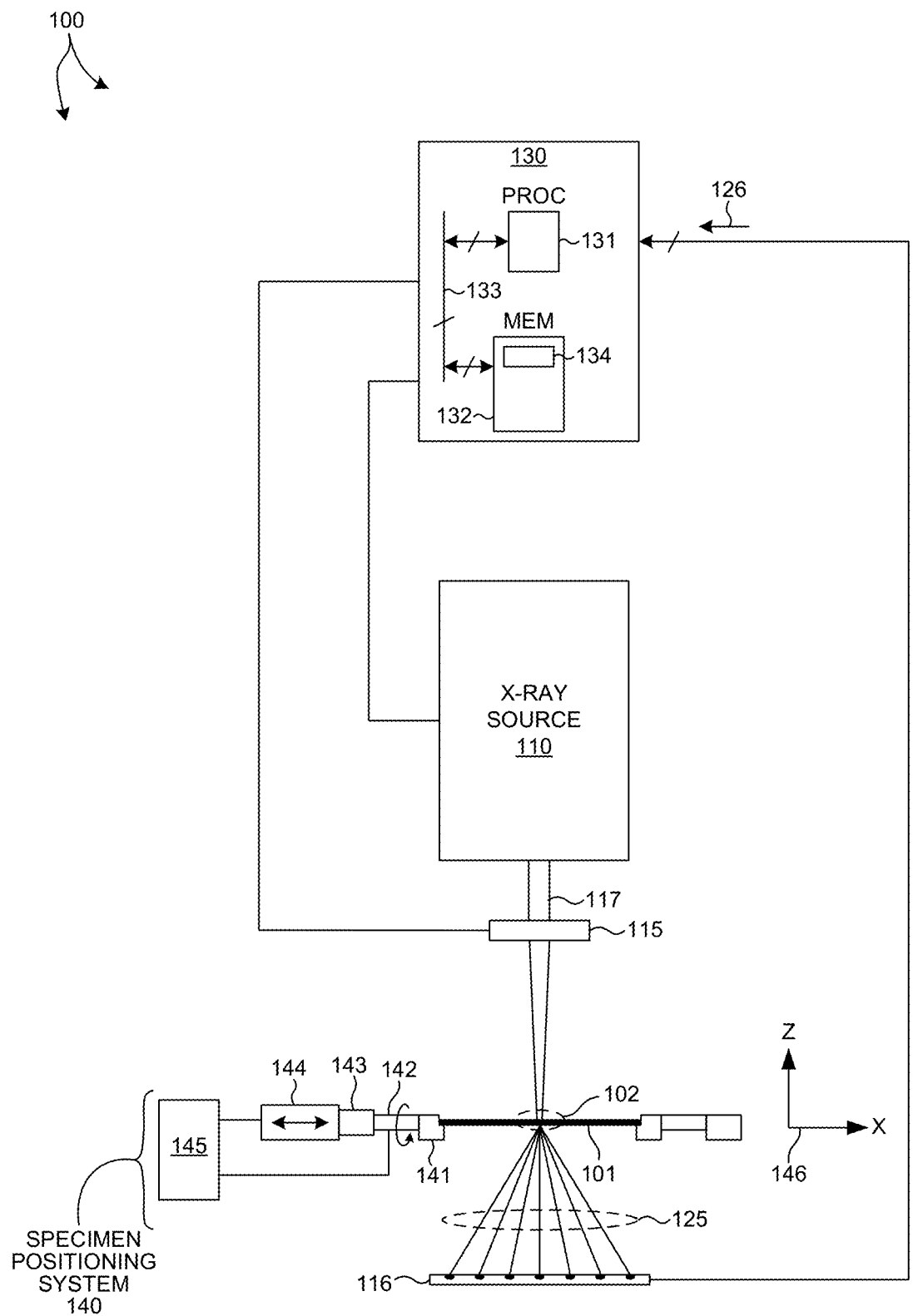
FIG. 1 is a diagram illustrative of a metrology system 100 configured to measure characteristics of a specimen in accordance with the methods described herein.

FIG. 1 illustrates an embodiment of a metrology system 100 for measuring characteristics of a specimen in accordance with the exemplary methods presented herein. As shown in FIG. 1, the system 100 may be used to perform x-ray scatterometry measurements over an inspection area 102 of a specimen 101 disposed on a specimen positioning system 140.

In the depicted embodiment, metrology tool 100 includes an x-ray illumination source 110 configured to generate x-ray radiation suitable for x-ray scatterometry measurements. In some embodiments, the x-ray illumination system 110 is configured to generate wavelengths between 0.01 nanometers and 1 nanometer. X-ray illumination source 110 produces an x-ray beam 117 incident on inspection area 102 of specimen 101.

In general, any suitable high-brightness x-ray illumination source capable of generating high brightness x-rays at flux levels sufficient to enable high-throughput, inline metrology may be contemplated to supply x-ray illumination for x-ray scatterometry measurements. In some embodiments, an x-ray source includes a tunable monochromator that enables the x-ray source to deliver x-ray radiation at different, selectable wavelengths.

In some embodiments, one or more x-ray sources emitting radiation with photon energy greater than 15 keV are employed to ensure that the x-ray source supplies light at wavelengths that allow sufficient transmission through the entire device as well as the wafer substrate. By way of non-limiting example, any of a particle accelerator source, a liquid anode source, a rotating anode source, a stationary, solid anode source, a microfocus source, a microfocus rotating anode source, and an inverse Compton source may be employed as x-ray source 110. In one example, an inverse Compton source available from Lyncean Technologies, Inc., Palo Alto, California (USA) may be contemplated. Inverse Compton sources have an additional advantage of being able to produce x-rays over a range of photon energies, thereby enabling the x-ray source to deliver x-ray radiation at different, selectable wavelengths.

Figure 2:
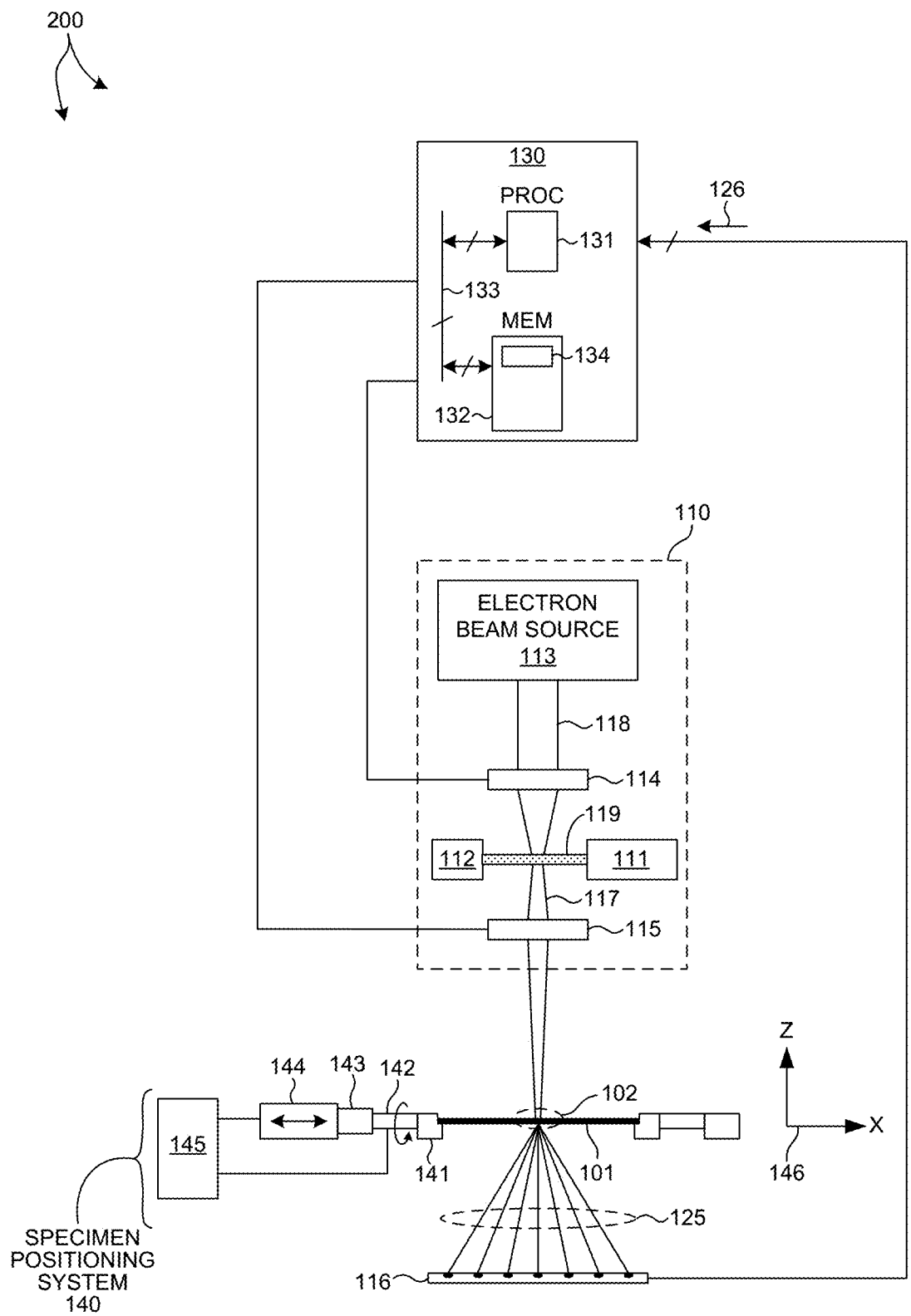
FIG. 2 is a diagram illustrative of a metrology system 200 in another embodiment configured to measure characteristics of a specimen in accordance with the methods presented herein.

Exemplary x-ray sources include electron beam sources configured to bombard solid or liquid targets to stimulate x-ray radiation. FIG. 2 depicts a metrology system 200 for measuring characteristics of a specimen in accordance with the exemplary methods presented herein. Like numbered elements of metrology tool 100 and 200 are analogous. However, in the embodiment depicted in FIG. 2, x-ray illumination source 110 is a liquid metal based x-ray illumination system. A jet of liquid metal 119 is produced from a liquid metal container 111 and collected in a liquid metal collector 112. A liquid metal circulation system (not shown) returns liquid metal collected by collector 112 to liquid metal container 111. The jet of liquid metal 119 includes one or more elements. By way of non-limiting example, the jet of liquid metal 119 includes any of Aluminum, Gallium, Indium, Tin, Thallium, and Bismuth. In this manner, the jet of liquid metal 119 produces x-ray lines corresponding with its constituent elements. In one embodiment, the jet of liquid metal includes a Gallium and Indium alloy. In some embodiments, the x-ray illumination system 110 is configured to generate wavelengths between 0.01 nanometers and 1 nanometer. An electron beam source 113 (e.g., electron gun) produces a stream of electrons 118 that is directed by electron optics 114 to the jet of liquid metal 119. Suitable electron optics 114 includes electromagnets, permanent magnets, or a combination of electromagnets and permanent magnets for focusing the electron beam and directing the beam at the liquid metal jet. The coincidence of the jet of liquid metal 119 and the stream of electrons 118 produces an x-ray beam 117 incident on inspection area 102 of specimen 101.

Methods and systems for generating high brightness, liquid metal x-ray illumination are described in U.S. Pat. No. 7,929,667, issued on Apr. 19, 2011, to KLA-Tencor Corp., the entirety of which is incorporated herein by reference.

In one embodiment, the incident x-ray beam 117 is at the Indium kα line of 24.2 keV. The x-ray beam is collimated down to less than one milliradian divergence using multilayer x-ray optics for x-ray scatterometry measurements.

In some embodiments, x-ray scattering measurements described herein are achieved without using a screen located between the x-ray source and the specimen under measurement. In these embodiments, the measured intensities of the incident beam over a range of angles of incidence, multiple wavelengths, or a combination of both, provide sufficient information to resolve a distribution map (i.e., image) of a desired material property (e.g., complex refractive index, electron density, or absorptivity) of the measured structure. However, in some other examples, a pinhole or another aperture is located on an otherwise opaque screen that is located between the x-ray source and the specimen under measurement to improve collimation of the x-ray beam. The intensity of the diffraction pattern is measured for several positions of the aperture. In some other embodiments, a screen with a pseudo-random aperture pattern is used, and the diffraction pattern is measured for multiple screens. These approaches may also be contemplated to provide additional information to resolve the three-dimensional distribution of the desired material property of the measured structure.

In some embodiments, the profile of the incident x-ray beam is controlled by two or more apertures, slits, or a combination thereof. In a further embodiment, the apertures, slits, or both, are configured to rotate in coordination with the orientation of the specimen to optimize the profile of the incident beam for each angle of incidence, azimuth angle, or both.

As depicted in FIG. 1, x-ray optics 115 shape and direct incident x-ray beam 117 to specimen 101. In some examples, x-ray optics 115 include an x-ray monochromator to monochromatize the x-ray beam that is incident on the specimen 101. In one example, a crystal monochromator such as a Loxley-Tanner-Bowen monochromator is employed to monochromatize the beam of x-ray radiation. In some examples, x-ray optics 115 collimate or focus the x-ray beam 117 onto inspection area 102 of specimen 101 to less than 1 milliradian divergence using multilayer x-ray optics. In some embodiments, x-ray optics 115 includes one or more x-ray collimating mirrors, x-ray apertures, x-ray beam stops, refractive x-ray optics, diffractive optics such as zone plates, specular x-ray optics such as grazing incidence ellipsoidal mirrors, polycapillary optics such as hollow capillary x-ray waveguides, multilayer optics, or systems, or any combination thereof. Further details are described in U.S. Patent Publication No. 2015/0110249, the content of which is incorporated herein by reference it its entirety.

In general, the focal plane of the illumination optics system is optimized for each measurement application. In this manner, system 100 is configured to locate the focal plane at various depths within the specimen depending on the measurement application.

X-ray detector 116 collects x-ray radiation 125 scattered from specimen 101 and generates output signals 126 indicative of properties of specimen 101 that are sensitive to the incident x-ray radiation in accordance with an x-ray scatterometry measurement modality. In some embodiments, scattered x-rays 125 are collected by x-ray detector 116 while specimen positioning system 140 locates and orients specimen 101 to produce angularly resolved scattered x-rays.

In some embodiments, an x-ray scatterometry system includes one or more photon counting detectors with high dynamic range (e.g., greater than $10^5$) and thick, highly absorptive crystal substrates that absorb the direct beam (i.e., zero order beam) without damage and with minimal parasitic backscattering. In some embodiments, a single photon counting detector detects the position and number of detected photons.

Full beam x-ray scatterometry requires collection of the zero order beam along with higher diffraction orders. The zero order beam is several orders of magnitude more intense than the other orders. If the zero order beam is not fully absorbed in the X-Ray sensitive section of the detector, it will scatter and generate parasitic signals. The strength of these parasitic signals limits the dynamic range of the measurement. For example, if the parasitic signal is $10^{-4}$ of the largest flux signal (i.e., the zero order signal), the signals associated with many higher orders will be contaminated. Thus, it is critical that the detector (e.g., detector 116) exhibit high conversion efficiency of X-rays to electron hole pairs and high X-ray absorption to increase the effective dynamic range of the full beam metrology.

Exemplary detector materials suitable for full beam x-ray scatterometry include Cadmium Telluride (CdTe), Germanium (Ge) and Gallium Arsenide (GaAs) crystals, and others. In some embodiments, the detector material is selected to provide high conversion efficiency in a narrow energy band corresponding to the source energy.

In some embodiments, the thickness of the detector material is selected to achieve the desired absorption of incoming X-rays. In some embodiments, the detector is tilted with respect to the incoming X-ray beams (the various diffraction orders) to increase the path length of the X-ray beams through the detector material, and thus, increase the total amount of absorption.

In some embodiments, dual threshold detectors are employed to improve SNR.

In some embodiments, the x-ray detector resolves one or more x-ray photon energies and produces signals for each x-ray energy component indicative of properties of the specimen. In some embodiments, the x-ray detector 116 includes any of a CCD array, a microchannel plate, a photodiode array, a microstrip proportional counter, a gas filled proportional counter, a scintillator, or a fluorescent material.

In this manner the X-ray photon interactions within the detector are discriminated by energy in addition to pixel location and number of counts. In some embodiments, the X-ray photon interactions are discriminated by comparing the energy of the X-ray photon interaction with a predetermined upper threshold value and a predetermined lower threshold value. In one embodiment, this information is communicated to computing system 130 via output signals 126 for further processing and storage.

In some embodiments, the detector is scanned relative to the incoming X-rays to mitigate damage or excessive charging from the incident zero order beam. In some of these embodiments, the detector is continuously scanned with respect to the incoming X-rays to avoid having the zero order beam dwell on a particular location on the detector surface for an extended period of time. In some other embodiments, the detector is periodically moved with respect to the incoming X-rays to avoid having the zero order beam dwell on a particular location on the detector surface for an extended period of time. In some embodiments, the scanning or periodic movements are approximately perpendicular to the incoming X-rays. In some embodiments, the movements are rotational (e.g., the detector is rotated such that a particular location on the detector surface traces out a circle in space). In some embodiments, the movements are a combination of translational movements that move the point of incidence of the zero order beam to various different locations on the detector surface.

In an x-ray scatterometry measurement, a structure (e.g., a high aspect ratio, vertically manufactured structure) diffracts a collimated X-ray beam into diffraction orders. Each diffraction order travels in a particular, predictable direction. The angular spacing of the diffraction orders is inversely proportional to the lattice constant of the specimen divided by the wavelength. The diffraction orders are detected by a detector array placed at some distance from the wafer. Each pixel of the detector outputs a signal that indicates the number of photons that hit the pixel.

The intensities of diffraction orders are of the form I (m, n, θ, φ, λ), where {m, n} are integer indices of diffraction orders, {θ, φ} are elevation and azimuth angles of the incident beam (i.e., polar coordinates of the incident chief ray with respect to a coordinate system that is fixed to the wafer), and λ is the wavelength of the incident X-ray.

Several noise sources perturb the illumination light as it exits the illumination source and propagates toward the specimen. Exemplary disturbances include electron beam current fluctuation, temperature induced optic drift, etc. The perturbed incident flux is denoted as $F_0 (1+n_1)$.

The target scatters the incident radiation in a manner that depends on the azimuth and elevation angles of the incident beam. The efficiency of light scattering into orders (m, n) can be defined as $S_{mn}$ (θ, φ). As the diffracted light propagates from the specimen to the detector, the beam passes through other scattering media that affect all orders similarly with some variation $(1+n_2)$ and parasitic noise $(n_3)$. In this manner the total intensity $I_{mn}$ of each order measured in a time, t, can be expressed by equation (1).

$$I_{mn} = S_{mn}(\theta, \phi)(1 + n_2)(1 + n_1)F_0 t + n_3 \quad (1)$$

In some embodiments, it is desirable to perform measurements at different orientations described by rotations about the x and y axes indicated by coordinate system 146 depicted in FIG. 1. This increases the precision and accuracy of measured parameters and reduces correlations among parameters by extending the number and diversity of data sets available for analysis to include a variety of large-angle, out of plane orientations. Measuring specimen parameters with a deeper, more diverse data set also reduces correlations among parameters and improves measurement accuracy. For example, in a normal orientation, x-ray scatterometry is able to resolve the critical dimension of a feature, but is largely insensitive to sidewall angle and height of a feature. However, by collecting measurement data over a broad range of out of plane angular positions, the sidewall angle and height of a feature can be resolved.

As illustrated in FIG. 1, metrology tool 100 includes a specimen positioning system 140 configured to both align specimen 101 and orient specimen 101 over a large range of out of plane angular orientations with respect the scatterometer. In other words, specimen positioning system 140 is configured to rotate specimen 101 over a large angular range about one or more axes of rotation aligned in-plane with the surface of specimen 101. In some embodiments, specimen positioning system 140 is configured to rotate specimen 101 within a range of at least 90 degrees about one or more axes of rotation aligned in-plane with the surface of specimen 101. In some embodiments, specimen positioning system is configured to rotate specimen 101 within a range of at least 120 degrees about one or more axes of rotation aligned in-plane with the surface of specimen 101. In some other embodiments, specimen positioning system is configured to rotate specimen 101 within a range of at least one degree about one or more axes of rotation aligned in-plane with the surface of specimen 101. In this manner, angle resolved measurements of specimen 101 are collected by metrology system 100 over any number of locations on the surface of specimen 101. In one example, computing system 130 communicates command signals to motion controller 145 of specimen positioning system 140 that indicate the desired position of specimen 101. In response, motion controller 145 generates command signals to the various actuators of specimen positioning system 140 to achieve the desired positioning of specimen 101.

By way of non-limiting example, as illustrated in FIG. 1, specimen positioning system 140 includes an edge grip chuck 141 to fixedly attach specimen 101 to specimen positioning system 140. A rotational actuator 142 is configured to rotate edge grip chuck 141 and the attached specimen 101 with respect to a perimeter frame 143. In the depicted embodiment, rotational actuator 142 is configured to rotate specimen 101 about the x-axis of the coordinate system 146 illustrated in FIG. 1. As depicted in FIG. 1, a rotation of specimen 101 about the z-axis is an in plane rotation of specimen 101. Rotations about the x-axis and the y-axis (not shown) are out of plane rotations of specimen 101 that effectively tilt the surface of the specimen with respect to the metrology elements of metrology system 100. Although it is not illustrated, a second rotational actuator is configured to rotate specimen 101 about the y-axis. A linear actuator 144 is configured to translate perimeter frame 143 in the x-direction. Another linear actuator (not shown) is configured to translate perimeter frame 143 in the y-direction. In this manner, every location on the surface of specimen 101 is available for measurement over a range of out of plane angular positions. For example, in one embodiment, a location of specimen 101 is measured over several angular increments within a range of −45 degrees to +45 degrees with respect to the normal orientation of specimen 101.

In general, specimen positioning system 140 may include any suitable combination of mechanical elements to achieve the desired linear and angular positioning performance, including, but not limited to goniometer stages, hexapod stages, angular stages, and linear stages.

Figure 3:
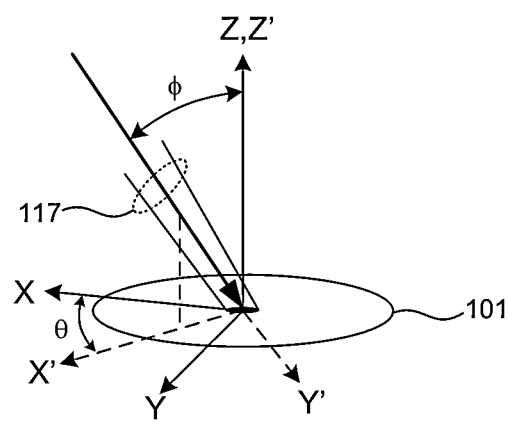
FIG. 3 depicts an x-ray illumination beam incident on a wafer at a particular orientation described by angles ϕ and θ.

In some embodiments, x-ray scatterometry measurements are performed at multiple orientations of the illuminating x-ray beam relative to the surface normal of the semiconductor wafer. Each orientation is described by any two angular rotations of wafer 101 with respect to the x-ray illumination beam, or vice-versa. In one example, the orientation can be described with respect to a coordinate system fixed to the wafer. FIG. 3 depicts x-ray illumination beam 117 incident on wafer 101 at a particular orientation described by angles φ and θ. Coordinate frame XYZ is fixed the metrology system and coordinate frame X'Y'Z' is fixed to wafer 101. Z is aligned with an axis normal to the surface of wafer 101. X and Y are in a plane aligned with the surface of wafer 101. Similarly, Z' is aligned with an axis normal to the surface of wafer 101, and X' and Y' are in a plane aligned with the surface of wafer 101. As depicted in FIG. 3, x-ray illumination beam 117 lies within the X'Z' plane. Angle, φ, describes the orientation of the x-ray illumination beam 117 with respect to the surface normal of the wafer in the X'Z' plane. Furthermore, angle, θ, describes the orientation of the X'Z' plane with respect to the XZ plane. Together, θ and φ, uniquely define the orientation of the x-ray illumination beam 117 with respect to the surface of wafer 101. In this example, the orientation of the x-ray illumination beam with respect to the surface of wafer 101 is described by a rotation about an axis normal to the surface of wafer 101 (i.e., Z axis) and a rotation about an axis aligned with the surface of wafer 101 (i.e., Y' axis). In some other examples, the orientation of the x-ray illumination beam with respect to the surface of wafer 101 is described by a rotation about a first axis aligned with the surface of wafer 101 and another axis aligned with the surface of wafer 101 and perpendicular to the first axis as described with reference to FIG. 1.

In a further aspect, an x-ray scatterometry system is employed to determine properties of a specimen (e.g., structural parameter values) based on x-ray scatterometry images. As depicted in FIG. 1, metrology tool 100 includes a computing system 130 employed to acquire signals 126 generated by detector 116 and determine properties of the specimen based at least in part on the acquired signals.

Figure 4:
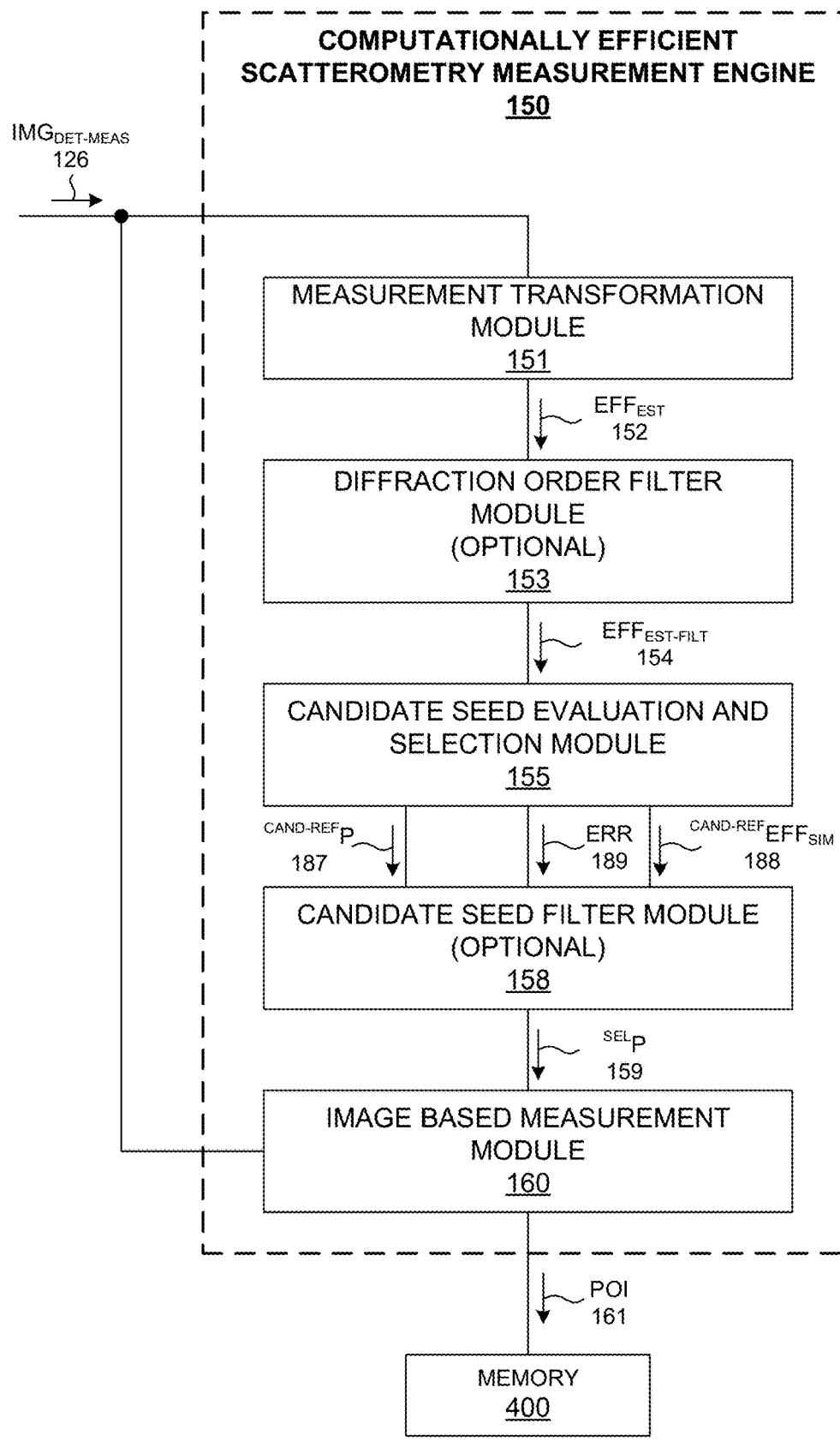
FIG. 4 is a diagram illustrative of a computationally efficient scatterometry measurement engine 150 configured to resolve specimen parameter values based on x-ray scatterometry data in accordance with the methods described herein.

FIG. 4 is a diagram illustrative of a computationally efficient scatterometry measurement engine 150 configured to estimate values of one or more parameters of interest characterizing a structure under measurement based on x-ray scatterometry data. In one embodiment depicted in FIG. 1, computing system 130 is configured as a computationally efficient scatterometry measurement engine 150 to implement measurement functionality as described herein.

In general, values of one or more parameters of interest (e.g., critical dimension, sidewall angle, height, overlay, etc.) are determined by an inverse solution of a detector image based measurement model. A regression is performed on the detector image data and the regression parameters are the parameters of interest. Seed values of the one or more parameters of interest are provided as initial values of the one or more parameters of interest for the first iteration of the regression. The computationally efficient scatterometry measurement engine 150 includes modules to determine the seed values such that the image based regression converges to the global minimum with a dramatically reduced number of iterations. In this manner, values of parameters of interest are estimated with dramatically reduced computational effort.

As depicted in FIG. 4, computationally efficient scatterometry measurement engine 150 includes a measurement transformation module 151, a diffraction order filter module 153, a candidate seed evaluation and selection module 155, a candidate seed filter module 158, and an image based measurement module 160.

Figure 10:
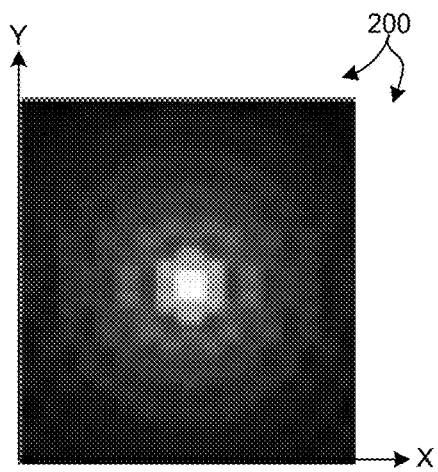
FIG. 10 is a plot illustrative of a measured image collected at a detector.

A measured image, $IMG_{DET-MEAS}$ 126, collected at a detector of an x-ray scatterometry system, e.g., detector 116 depicted in FIG. 1, is communicated to measurement transformation module 151. Measurement transformation module 151 transforms the measured image at the detector, $IMG_{DET-MEAS}$ 126, into a set of estimated diffraction order efficiency values, $EFF_{EST}$ 152. FIG. 10 is a plot 200 illustrative of a measured image collected at a detector. As depicted in FIG. 10, the image extends in two dimensions, e.g., the x-direction and the y-direction depicted in FIG. 10, corresponding to the planar surface of the detector.

Figure 11:
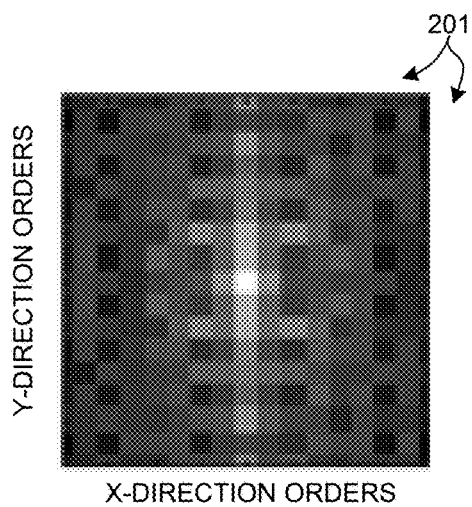
FIG. 11 is a plot illustrative of a two dimensional image of diffraction order efficiency values derived from the detector image depicted in FIG. 10.

In one aspect, measurement transformation module 151 transforms the measured image, i.e., measured photon counts on a detector grid, into a set of estimated diffraction order efficiency values. Each estimated diffraction order efficiency value corresponds to a different diffraction order. FIG. 11 is a plot 201 illustrative of a two dimensional image of diffraction order efficiency values derived from the detector image depicted in FIG. 10. As depicted in FIG. 11, the image extends in two dimensions, e.g., the x-direction diffraction orders and the y-direction diffraction orders. The brightness of each pixel of image 201 corresponds to the value of diffraction order efficiency associated with each corresponding diffraction order. As illustrated in FIG. 11, the bright spot in the middle of the diagram corresponds with the zeroth diffraction order.

In general, a scattering image, such as image 200 depicted in FIG. 10, is the measured photon count at each pixel of the detector. At the hard X-ray limit, the measured photon count on the detector at a particular pixel is linearly proportional to the order efficiency of the diffraction order falling on the pixel. However, computing the order efficiency from the photon count of a pixel is not straight forward due to the overlap of multiple diffraction orders on each pixel, large beam profile, and the logarithmic scale of the diffraction efficiency range.

In one aspect, a linear model is employed to compute order efficiency values from each scattering image. This approach is based on the notion that the scaling of the photon counts in the image domain is approximately equal to the scaling of efficiencies in the diffraction orders domain.

In a further aspect, the estimated values of the set of diffraction order efficiencies are normalized between upper and lower bound values. Normalization of the values of the estimated values of the set of diffraction order efficiencies minimizes the effect of large dynamic range.

In some examples, the upper and lower bound values associated with each diffraction order efficiency are extracted from a pre-generated, parameter-efficiency library including simulated sets of values of the diffraction order efficiencies. Each of the simulated sets of values of the diffraction order efficiencies is associated with a different set of specimen parameters characterizing the structure under measurement. In general, the simulated sets of values of the diffraction order efficiencies are determined based on a forward measurement model. The forward measurement model estimates diffraction order efficiencies associated with a measurement of a structure characterized by assumed values of the specimen parameters. The different sets of specimen parameter values are designed to span the process space of the structure under measurement.

The upper bound value associated with each diffraction order efficiency is the maximum value associated with each diffraction order efficiency among all of the simulated sets of values of the diffraction order efficiencies stored in the pre-generated parameter-efficiency library. $UB_i$ is the upper bound value associated with the $i^{th}$ diffraction order. Similarly, the lower bound value associated with each diffraction order efficiency is the minimum value associated with each diffraction order efficiency among all of the simulated sets of values of the diffraction order efficiencies stored in the pre-generated parameter-efficiency library. $LB_i$ is the lower bound value associated with the $i^{th}$ diffraction order.

In a further aspect, the array of lower bound efficiency values and the array of upper bound efficiency values are transformed into corresponding scattering images associated with the lower and upper bound efficiency values, respectively. A measurement system model estimates a scattering image at the detector associated with a measurement of a structure characterized by an array of diffraction order efficiency values. The scattering image represents the photon count at each pixel of the detector of the measurement system simulated by the measurement system model based on the diffraction order efficiency values provided as input to the measurement system model.

The measurement system model is employed to transform the set of lower bound efficiency values into a corresponding scattering image at the detector. This image is referred to as a Lower Bound Image (LBI). Similarly, the measurement system model is employed to transform the set of upper bound efficiency values into a corresponding scattering image at the detector. This image is referred to as an Upper Bound Image (UBI).

An averaging convolution filter is applied to the LBI, UBI, and the measured scattering image.

In a further aspect, a photon count associated with each diffraction order is estimated from each of the LBI, UBI, and the measured scattering image. The photon count associated with each diffraction order is computed using spline interpolation at each assumed order center location on the detector plane.

The estimated diffraction order efficiency values associated with the measured image is determined by Equation (2), $$EFF_i = LB_i + S_i(UB_i - LB_i) \quad (2)$$

where $EFF_i$ is the reconstructed diffraction order efficiency value associated with the $i^{th}$ diffraction order, $UB_i$ is the upper bound value associated with the $i^{th}$ diffraction order, $LB_i$ is the lower bound value associated with the $i^{th}$ diffraction order, and $S_i$ is a scaling factor illustrated by Equation (3), $$S_i = (IMG_i - LBI_i)/(UBI_i - LBI_i) \quad (3)$$

where $IMG_i$ is the photon count associated with the $i^{th}$ diffraction order estimated from the measured scattering image, $LBI_i$ is the photon count associated with the $i^{th}$ diffraction order estimated from the LBI using interpolation, and $UBI_i$ is the photon count associated with the $i^{th}$ diffraction order estimated from the UBI using interpolation.

The scaling of the diffraction efficiencies between lower and upper bounds using the scale factor, S, eliminates the instability due to the logarithmic scale of the order efficiencies. In addition, the scale factor, S, maintains the numerical value of each diffraction order efficiency within a physical limit. This preserves the relation between overlapping neighboring orders. Furthermore, the convolution filter and spline interpolation described hereinbefore reduce the finite large beam profile effects in the scattering image.

A scatterometry based measurement of a complex DRAM structure is simulated. The simulated measured image data is simulated along with the diffraction order efficiency values associated with the measurement.

Figure 13:
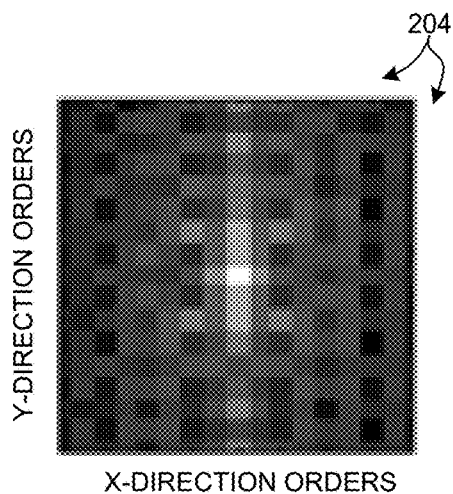
FIG. 13 depicts a plot illustrative of simulated diffraction order efficiency values associated with a measurement.

FIG. 13 depicts a plot 204 of the simulated diffraction order efficiency values of the measurement. X-direction diffraction orders at the detector are plotted along the x-axis, and y-direction diffraction orders at the detector are plotted along the y-axis. The simulated diffraction order efficiency values are the "true" values of the diffraction order efficiencies associated with the simulated measurement.

Figure 14:
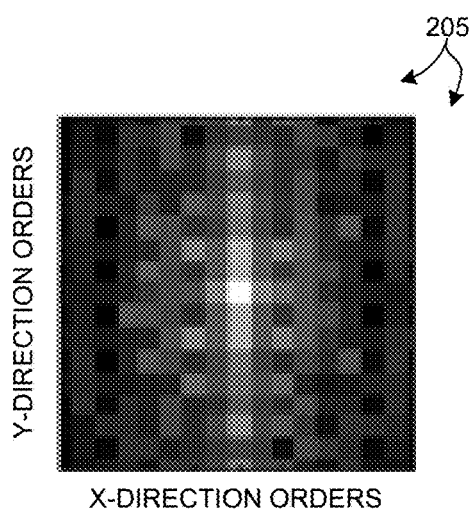
FIG. 14 depicts a plot illustrative of diffraction order efficiency values estimated from simulated measured image data associated with the measurement of FIG. 13.

FIG. 14 depicts a plot 205 of diffraction order efficiency values estimated from the simulated measured image data in accordance with Equations (2) and (3) as described hereinbefore.

Figure 15:
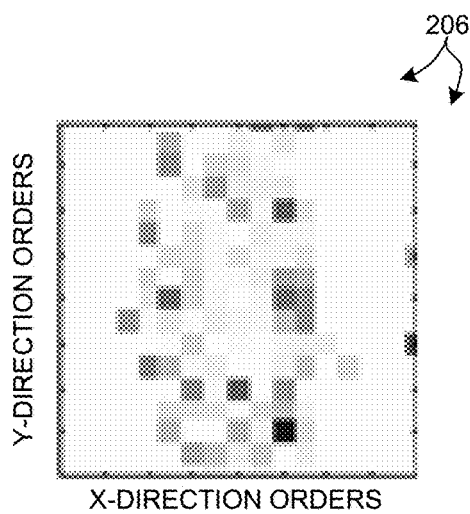
FIG. 15 depicts a plot illustrative of the log residual differences between the values of the diffraction order efficiencies depicted in FIG. 13, and the estimated values of the diffraction order efficiencies depicted in FIG. 14.

FIG. 15 depicts a plot 206 illustrative of the log residual differences between the "true" values of the diffraction order efficiencies depicted in FIG. 13, and the estimated values of the diffraction order efficiencies depicted in FIG. 14. As depicted in FIGS. 13-15, the values of the diffraction order efficiencies estimated in accordance with Equations (2) and (3) are close to the "true" values of the diffraction order efficiencies.

In another aspect, a trained machine learning based model is employed to compute order efficiency values from each measured scattering image. In this manner, the trained machine learning based model transforms measured photon counts on the detector grid into a diffraction efficiency associated with each scattering order. In some examples, a generalized machine learning based model, such as an artificial neural network, is employed. In these examples, a generalized mathematical model is trained based on a large number of trusted input and output values to mimic the complex relationship between the two. In some examples, an artificial neural network requires at least 10,000 trusted training samples including efficiencies and corresponding detector images. In some examples, model training is performed using normalized order efficiencies bracketed between minimum and maximum values.

In some examples, the training data sets are generated synthetically. In one example, the measurement system model is employed to compute a detector image corresponding to each set of simulated diffraction order efficiency data of the pre-computed parameter-efficiency library. In these examples, each set of simulated diffraction order efficiency data and corresponding detector image is treated as a training output and input, respectively, of the artificial neural network. In this manner, the machine learning based model is trained to compute order efficiency values from each measured scattering image.

In some examples, a neural network architecture with fully connected layers linking the vectorized photon counts of the images to vectorized order efficacies is employed. In some of these examples, a multi-layer perceptron (MLP) model accepts an array of one dimensional data, i.e., vectorized image data, as input and directly forces a coupled relationship between photon counts of the pixels to the order efficiencies using several fully connected layers.

In some other examples, a neural network architecture with a combination of convolution layers and fully connected layers is employed. In these examples, two dimensional features of the images are extracted and processed in different layers. In some of these examples, a convolutional neural network (CNN) layer treats images as ordered two dimensional grids. The CNN layer is coupled to one or more fully connected layers employed to identify, classify, and quantify common features observed in the input data. Image meta data, such as angle of incidence, is provided as input through auxiliary layers that connect directly to the fully connected layers.

In some embodiments, diffraction order efficiency values are determined from each scattering image using a combination of a trained machine learning based model and the linear model described hereinbefore.

As depicted in FIG. 4, the set of estimated diffraction order efficiency values, $EFF_{EST}$ 152, is communicated to diffraction order filter module 153. In a further aspect, diffraction order filter module 153 estimates a value indicative of a signal to noise ratio associated with each of the set of diffraction order efficiency values, and filters the set of diffraction order efficiency values based on the estimated values indicative of the signal to noise ratio. The resulting filtered diffraction order efficiency values, $EFF_{EST\text{-}FILT}$ 154, are communicated to candidate seed evaluation and selection module 155.

Diffraction orders having diffraction efficiency values with low signal to noise ratio have the potential to skew the seeding results. In a preferred embodiment, diffraction orders having diffraction efficiency values with low signal to noise ratio are filtered out to improve the accuracy and reduce the time to solution associated with determining one or more sets of seed values. The diffraction orders that are filtered out are discarded and not utilized in further calculations employed to determine one or more sets of seed values.

In some examples, diffraction order filter module 153 utilizes scale factor, $S_i$, as the value indicative of the signal to noise ratio associated with the efficiency value of the $i^{th}$ diffraction order. In some examples, if the value of scale factor, S, is greater than one or less than zero for a particular diffraction order, the diffraction order is discarded. Experience has shown that these orders have diffraction order efficiency values with low magnitude and are heavily contaminated with measurement noise. In general, however, any desired threshold values for scale factor, S, may be employed as cutoff values to filter the diffraction orders.

Figure 12:
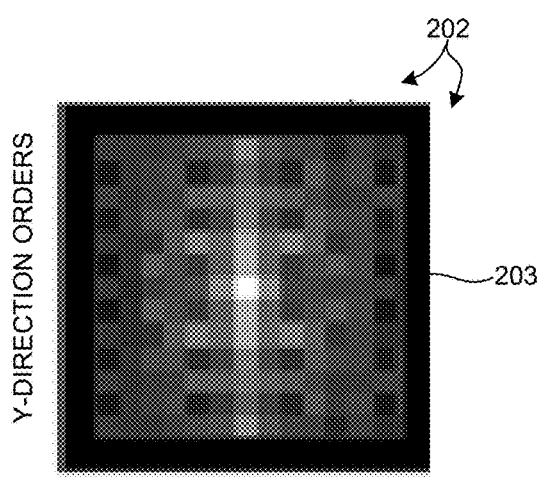
FIG. 12 is a plot illustrative of a two dimensional image of filtered diffraction order efficiency values derived from the two dimensional image of diffraction order efficiency values depicted in FIG. 11.

FIG. 12 is a plot 202 illustrative of a two dimensional image of filtered diffraction order efficiency values derived from the two dimensional image of diffraction order efficiency values depicted in FIG. 11. As depicted in FIG. 12, the diffraction orders arranged on the perimeter 203 of the image are filtered out, leaving a two dimensional image of diffraction order efficiency values having smaller dimension compared to the unfiltered two dimensional image of diffraction order efficiency values depicted in FIG. 11.

Although, diffraction order filter module 153 is included as part of the embodiment of computationally efficient scatterometry measurement engine 150 depicted in FIG. 4, in general, diffraction order filter module 153 is optional. If diffraction order filter module 153 is not employed, the estimated diffraction order efficiency values, $EFF_{EST}$ 152, are communicated directly to candidate seed evaluation and selection module 155.

As depicted in FIG. 4, filtered diffraction order efficiency values, $EFF_{EST\text{-}FILT}$ 154, are communicated to candidate seed evaluation and selection module 155. In a further aspect, candidate seed evaluation and selection module 155 determines a value of an error metric characterizing a difference between each of a plurality of sets of simulated diffraction order efficiency values and the set of estimated diffraction order efficiency values, and selects a set of seed parameter values based on the value of the error metric. The resulting candidate seed parameter values, $^{CAND}S$ 157, and corresponding simulated efficiency values, $^{CAND}EFF_{SIM}$ 156 are communicated to candidate seed filter module 158.

Figure 5:
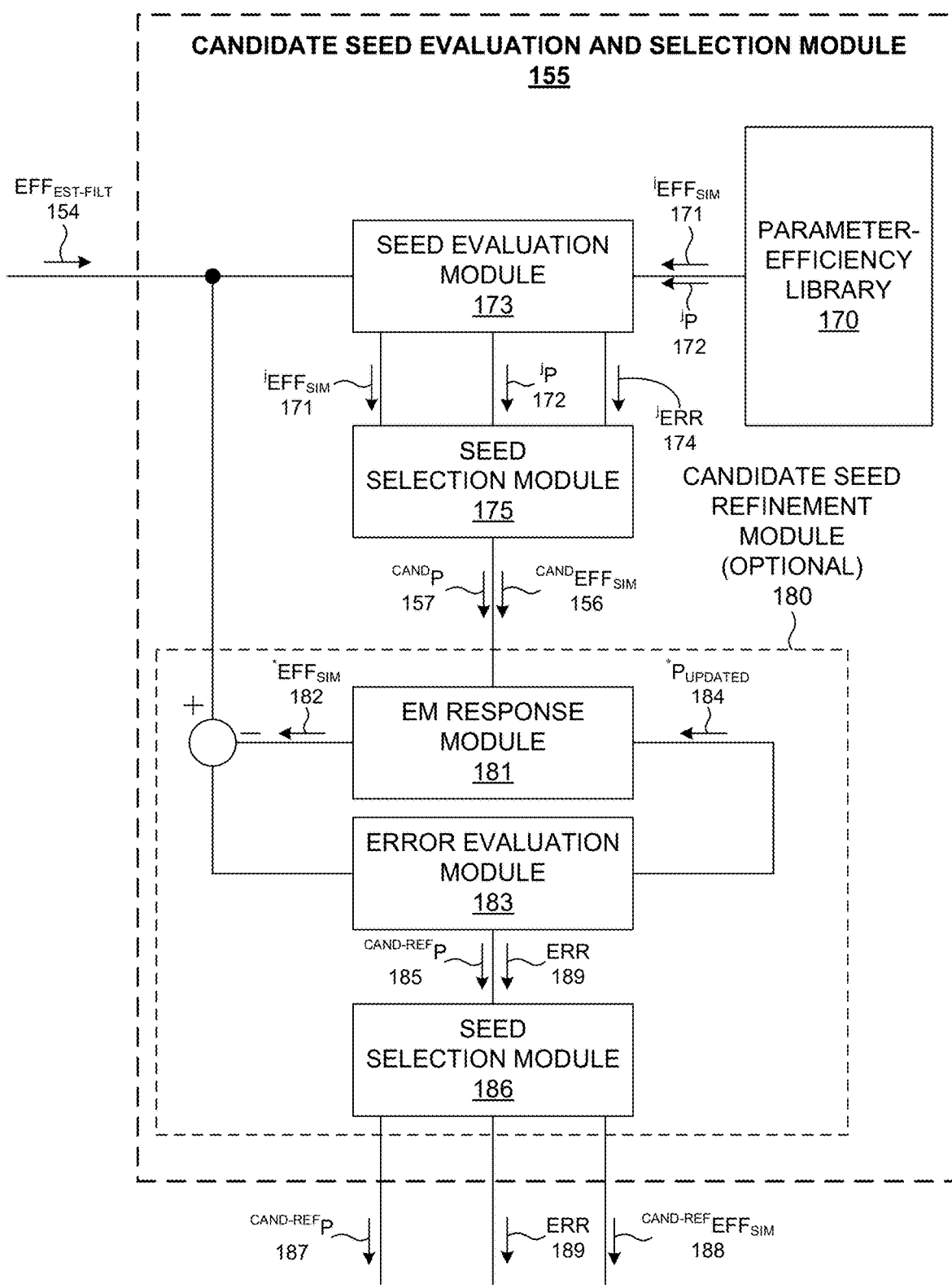
FIG. 5 is a diagram illustrative of a candidate seed evaluation and selection module configured to evaluate and select candidate sets of seed parameters in accordance with the methods described herein.

FIG. 5 depicts an illustration of a candidate seed evaluation and selection module 155 in one embodiment. As depicted in FIG. 5, the candidate seed evaluation and selection module 155 includes seed evaluation module 173, seed selection module 175, and a pre-computed parameter-efficiency library module 170.

As depicted in FIG. 5, the filtered diffraction order efficiency values, $EFF_{EST}$-FILT 154 are communicated to seed evaluation module 173. Alternatively, if optional diffraction order filter module is not utilized, estimated diffraction order efficiency values 152 associated with a measured detector image are communicated to seed evaluation module 173. In addition, a set of simulated efficiency values, $^{j}EFF_{SIM}$ 171, and the corresponding set of specimen parameter values, $^{j}p$ 172, are communicated to seed evaluation module 173. The index number, j, indicates each different parameter-efficiency pair, where j can be any integer number from one to the total number of parameter-efficiency pairs available in the parameter-efficiency library module 170. The set of simulated efficiency values, $^{j}EFF_{SIM}$ 171, includes the diffraction orders included in the filtered diffraction order efficiency values, $EFF_{EST\text{-}FILT}$ 154.

As described hereinbefore, the pre-computed parameter-efficiency library module 170 includes different sets of specimen parameter values designed to span the process space of the structure under measurement, and corresponding sets of diffraction order efficiency values associated with a measurement of a structure characterized by assumed values of the specimen parameters. In some examples, the pre-computed parameter-efficiency library module 170 includes thousands of different parameter-efficiency pairs.

Seed evaluation module 173 determines an error metric value, $^{j}ERR$ 174, characterizing a difference between the filtered diffraction order efficiency values, $EFF_{EST\text{-}FILT}$ 154 and each set of simulated efficiency values, $^{j}EFF_{SIM}$ 171. In this manner, seed evaluation module 173 generates an error metric value that quantifies the difference between measured data and simulated measurement data in efficiency space. Furthermore, the difference between measured data and simulated measurement data in efficiency space is quantified for geometric profiles that span the process space of the structure under measurement. By operating in efficiency space, the computational burden associated with exploring the differences throughout the process space is significantly reduced in comparison to performing the differences in image space.

In general, an error metric value characterizing a difference between the filtered diffraction order efficiency values, $EFF_{EST-FILT}$ 154, and each set of simulated efficiency values, $^{J}EFF_{SIM}$ 171, can be derived from a single error metric function or a combination of multiple, different error metric functions. By way of non-limiting example, an error metric value may be determined as a log scale residual difference between the filtered diffraction order efficiency values, $EFF_{EST-FILT}$ 154 and each set of simulated efficiency values, $^{J}EFF_{SIM}$ 171, a quadratic residual difference between the filtered diffraction order efficiency values, $EFF_{EST-FILT}$ 154 and each set of simulated efficiency values, $^{J}EFF_{SIM}$ 171, a noise weighted quadratic residual difference, a maximum likelihood estimator, a maximum a posteriori estimator, or any combination thereof. In general, any suitable mathematical function may be employed to express a difference between the filtered diffraction order efficiency values, $EFF_{EST-FILT}$ 154, and each set of simulated efficiency values, $^{J}EFF_{SIM}$ 171. Moreover, the error values determined in accordance with each function may be combined into a single error metric value in any suitable manner, e.g., summation, weighted summation, etc.

In some examples, an error metric function includes a regularization term. A regularization term is employed to improve seeding accuracy, ensure improved seeding coverage, or both. In some examples, the regularization term is a function of one or more specimen parameter values, $^{J}P$ 172, associated with each set of simulated efficiency values, $^{J}EFF_{SIM}$ 171, under consideration. In one example, a regularization term is $(TCD-BCD)^2$, where TCD is the top critical dimension and BCD is the bottom critical dimension of the structure under measurement. In this example, the regularization term ensures that selected sets of seed values have a side wall angle close to ninety degrees. In another example, a regularization term is $(Average\ CD-60\ nm)^2$ for j=1, $(Average\ CD-70\ nm)^2$ for j=2, $(Average\ CD-80\ nm)^2$ for j=3, etc. In this example, the regularization term ensures that all candidate sets of seed parameter values are separated and cover a large space.

In some examples, an error function includes a variance term associated with repeated measurement instances, i.e., repeated measurements of the same structure. In examples of precision measurements, it is preferable to select sets of seed values that promote repeatable measurement results, and thus relatively high precision. In some examples, an error function includes a term expressing the variance of one or more seed parameter values across repeated measurement instances. In one example, for a first measurement instance, the set of specimen parameter values, $^{J}P$ 172, having the lowest valued error metric, e.g., log residual, is selected because the measurement has not yet been repeated. However, for the third measurement instance, the error function includes the variance of one or more seed parameter values across the three measurement instances. In this manner, sets of seed values that promote repeatable values of the one or more seed parameters, i.e., minimum variance, are preferred over sets of seed values having less repeatable values of the one or more seed parameter, i.e., relatively large variance.

In some examples, an error function includes a smoothness term associated with measurement instances at different locations across the wafer surface. In examples of within wafer measurements, it is preferable to select sets of seed values that promote smooth measurement results across the wafer as process experience indicates that dimensions of fabricated structures tend to change slowly across the wafer surface, not dramatically. In some examples, an error function includes a term expressing the variance of one or more seed parameter values across sets of seed values associated with measurement instances in close spatial proximity to the measurement under consideration. In this manner, sets of seed values that promote smooth values of the one or more seed parameters, i.e., minimum variance across the values of the one or more seed parameters associated with measurement instances in close spatial proximity to the measurement under consideration, are preferred over sets of seed values having sharply different values of the one or more seed parameter, i.e., relatively large variance.

As depicted in FIG. 5, each set of simulated efficiency values, $^{J}EFF_{SIM}$ 171, the corresponding set of specimen parameter values, $^{J}P$ 172, and the error metric values, $^{J}ERR$ 174, associated with each evaluated parameter-efficiency pair are communicated to seed selection module 175. In a further aspect, seed selection module 175 selects one or more sets of specimen parameter values as candidate sets of seed parameter values based on the value of the error metric associated with each of the corresponding parameter-efficiency pairs.

In some examples, the values of the error metric associated with the j parameter-efficiency pairs under consideration are ranked in increasing order, and the parameter-efficiency pairs associated with the N top ranked pairs, i.e., parameter-efficiency pairs having the N lowest values error metric values, are selected as candidate sets of seed parameter values.

In some examples, a nearest neighbor search through the parameter-efficiency library 170 is performed to find the top N ranked pairs. In these examples, the j parameter-efficiency pairs are selected from the parameter-efficiency library and evaluated sequentially, i.e., one at a time, rather than in parallel.

In some examples, a clustering algorithm is employed to search through the parameter-efficiency library 170 to find the top N ranked pairs. Again, in these examples, the j parameter-efficiency pairs are selected from the parameter-efficiency library and evaluated sequentially, i.e., one at a time, rather than in parallel. A clustering algorithm ensures that selected candidate sets of seed parameter values are well separated from each other, and thus are more likely to converge to different minima.

In general, N is any non-zero, positive integer value less than or equal to j. In some examples, the parameter-efficiency pair associated with the lowest valued error metric is the only selected candidate set of seed parameter values. However, in preferred embodiments, multiple candidate sets of seed parameter values, $^{CAND}P$ 157, and corresponding candidate sets of simulated efficiency values, $^{CAND}EFF_{SIM}$ 156, are selected by candidate seed evaluation and selection module 155.

As depicted in FIGS. 4 and 5, candidate seed refinement module 180 and candidate seed filter module 158 are optional. If candidate seed refinement module 180 is not utilized, the selected candidate set of seed parameter values $^{CAND}P$ 157 and corresponding candidate sets of simulated efficiency values, $^{CAND}EFF_{SIM}$ 156, are communicated to candidate seed filter module 158. If neither optional module is utilized, the selected candidate set of seed parameter values, $^{CAND}P$ 157, are communicated directly to image based measurement module 160, and regression in image space is performed using the selected set of seed parameter values as the seed values for the regression.

As depicted in FIG. 5, the candidate sets of seed parameter values, $^{CAND}P$ 157, and corresponding candidate sets of simulated efficiency values, $^{CAND}EFF_{SIM}$ 156, selected by seed selection module 175 are communicated to optional candidate seed refinement module 180. In a further aspect, candidate seed refinement module 180 refines the values of each candidate set of seed parameter values by a regression on diffraction order efficiency values where the candidate seed parameter values are the regression parameters. The regression based refinement further closes the gap between the seed values of the specimen parameters and the global minima. For each candidate parameter-efficiency pair, the candidate set of seed parameter values is employed as the seed values of the regression on the diffraction order efficiency values.

As depicted in FIG. 5, in a first iteration, the difference between a candidate set of simulated efficiency values, $*EFF_{SIM}$ 182, of the candidate sets of simulated efficiency values, $^{CAND}EFF\,SIM$ 156, and the filtered efficiency values 154 is calculated. Error evaluation module 183 determines updated parameter values, $*P_{UPDATED}$ 184, based on the difference. Electromagnetic response module 181 estimates a new set of simulated efficiency values, $*EFF_{SIM}$ 182, based on the updated parameter values, $*P_{UPDATED}$ 184. In a second iteration, the difference between the new set of simulated efficiency values, $*EFF_{SIM}$ 182, and the filtered efficiency values 154 is calculated. The iteration is repeated until the difference between the simulated efficiency values, $*EFF_{SIM}$ 182, and the filtered efficiency values 154 is minimized. At the end of the regression, the updated set of parameter values, $*P_{UPDATED}$ 184, becomes a refined, candidate set of seed parameter values, $^{CAND-REF}P$ 185. For cases where multiple candidate-efficiency pairs are under consideration, the regression is performed on each candidate parameter-efficiency pair, and the output is multiple, refined, candidate sets of seed parameter values, $^{CAND-REF}P$ 185.

When multiple candidate-efficiency pairs are refined, another selection step may be employed. As depicted in FIG. 5, seed selection module 186 receives the refined, candidate sets of seed parameter values, $^{CAND-REF}P$ 185, and the value of an error metric, ERR 189, associated with each refined, candidate set of seed parameter values. As described hereinbefore, the error metric value characterizes a difference between the set of estimated diffraction order efficiency values and each set of simulated diffraction order efficiency values corresponding to the refined, candidate sets of seed parameter values, $^{CAND-REF}P$ 185. In some examples, the same error metric employed to characterize the parameter-efficiency pairs described with reference to seed selection module 175 is employed with reference to seed selection module 186. However, in other examples, the error metric employed by seed selection module 186 is different from the error metric employed by seed selection module 175.

In some examples, the refined parameter-efficiency pair associated with the lowest valued error metric is the only selected candidate set of seed parameter values. However, in preferred embodiments, multiple, refined, candidate sets of seed parameter values, $^{CAND-REF}P$ 187, and corresponding refined, candidate sets of simulated efficiency values, $^{CAND-REF}EFF_{SIM}$ 188, are selected by candidate seed evaluation and selection module 186.

If optional candidate seed filter module 158 is not utilized, the refined, candidate sets of seed parameter values, $^{CAND-REF}P$ 187, are communicated directly to image based measurement module 160, and regression in image space is performed using the selected set of seed parameter values as the seed values for the regression.

As depicted in FIG. 4, candidate seed filter module 158 receives refined, candidate sets of seed parameter values, $^{CAND-REF}P$ 187, corresponding refined, candidate sets of simulated efficiency values, $^{CAND-REF}EFF_{SIM}$ 188, and the error metric value, ERR 189, associated with each refined, candidate set of seed parameter values. In some examples, candidate seed filter module 158 determines a statistical distribution of the error metric values associated with each of the plurality of sets of simulated diffraction order efficiency values, and filters the plurality of sets of simulated diffraction order efficiency values based on a location of the value of the error metric associated with each of the plurality of sets of simulated diffraction order efficiency values within the statistical distribution. For example, all candidate sets of seed parameter values and corresponding simulated efficiency values associated with an error metric value outside one sigma of the mean value of the error metric values are discarded. In general, any statistical measure of distribution and any cutoff threshold may be employed to filter the refined, candidate sets of parameter-efficiency pairs. In some examples, the candidate sets of seed parameter values within the cutoff threshold are communicated directly to image based measurement module 160, and regression in image space is performed using the selected set of seed parameter values as the seed values for the regression.

In some other examples, candidate seed filter module 158 determines a Euclidean distance between each of the filtered, candidate sets of seed parameter values and the filtered candidate set of seed parameter values associated with the lowest valued error metric, and selects a filtered, candidate set of seed parameter values based on the Euclidian distance. In one example, candidate seed filter module 158 selects the filtered candidate set of seed parameter values associated with the lowest valued error metric as a selected set of seed parameter values, $^{SEL}P$ 159. Candidate seed filter module 158 determines the Euclidean distance between each of the filtered, candidate sets of seed parameter values within the cutoff threshold described hereinbefore and the selected set of seed parameter values associated with the lowest valued error metric. Candidate seed filter module 158 selects the filtered, candidate set of seed parameter values having the greatest Euclidean distance from the selected set of seed parameter values associated with the lowest valued error metric as another selected set of seed parameter values, $^{SEL}P$ 159.

In general, profiles close to the lowest error candidate are likely to also be close to the same minima as the lowest error candidate. Rather than selecting a seed profile that is likely to converge to the same minima, candidate seed filter module 158 selects the profile that is furthest away from the lowest error candidate. In this manner, the selected profile is likely to converge to different minima.

In a preferred embodiment, the Euclidean distance is computed based on normalized values of the specimen parameters, rather than the actual values. In these embodiments, each specimen parameter is normalized with respect to the lower and upper bound values of the parameter in the pre-generated parameter-efficiency library 170. In one example, the calculation of the normalized value of a specimen parameter, $x_{normalized}$, is illustrated in Equation (4), where x is the value of a seed parameter of a candidate set of seed parameter values, and $x_{min}$ and $x_{max}$ are the lower and upper bound values of the corresponding parameter in the pre-computed parameter-efficiency library, respectively.

$$x_{normalized} = (x - x_{min})/(x_{max} - x_{min}) \quad (4)$$

The lower and upper bound values of the in the pre-computed parameter-efficiency library are typically determined based on the processing range.

Although, candidate seed filter module 158 is included as part of the embodiment of computationally efficient scatterometry measurement engine 150 depicted in FIG. 4, in general, candidate seed filter module 158 is optional.

As depicted in FIG. 4, the selected sets of seed parameter values, $^{SEL}P$ 159, are communicated to image based measurement module 160. The image based measurement module 160 employs each selected set of seed parameter values, $^{SEL}P$ 159, as the seed values of a regression on image data, where the regression parameters are one or more specimen parameters of interest, e.g., a subset of the seed parameters. A detector image is determined based on the output of a trained machine learning based measurement model or a physics based measurement model. The image is compared to the actual measured image. The differences are employed to iteratively adjust the values of the one or more parameters of interest. Values of the parameters of interest are estimated that minimize errors between the measured scattered x-ray intensities and the simulated scattered x-ray intensities.

If multiple sets of seed parameter values are explored, the estimated values of the parameters of interest associated with the regression result having the smallest residual error is selected as the measured values of the parameters of interest, POI 161. In some examples, the residual error is computed using a $Chi^2$ measure of residual error.

As depicted in FIG. 4, the measured values of the parameters of interest, POI 161, are stored in memory 400.

Figure 6:
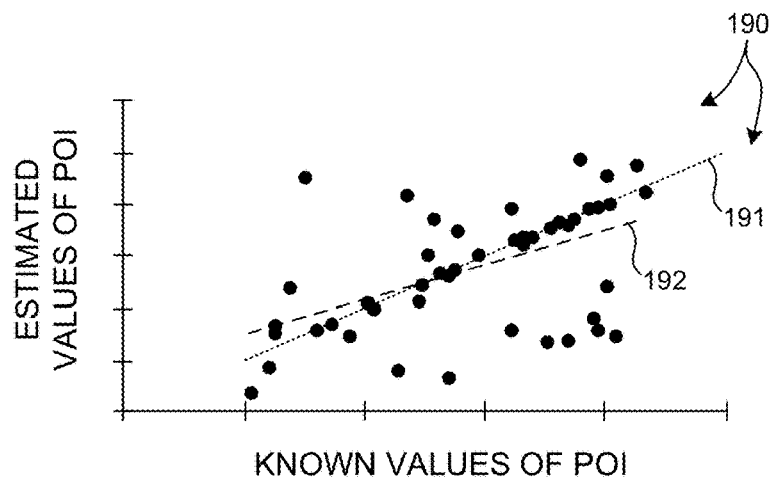
FIG. 6 is a plot illustrative of simulated scatterometry measurements of a complex DRAM structure without employing forward library based seeding as described herein.

FIG. 6 depicts a plot 190 of simulated scatterometry measurements of a complex DRAM structure without employing forward library based seeding as described herein. Measured image data are simulated based on known values of a parameter of interest. The measured image data are simulated with realistic parametric and measurement system noise. The known values of the parameter of interest are plotted along the x-axis. Estimated values of the parameter of interest are plotted along the y-axis. If the estimated values of the parameter of interest are perfectly matched to the known values, all data points should line up along line 192 depicted in FIG. 6. Estimated values of the parameter of interest are calculated based on regression on the simulated measured image data using nominal values of the floating parameters characterizing the structure under measurement as the seed values. The nominal values are defined as the midpoint of the perceived process range of possible values of each parameter. As depicted in FIG. 6, the estimated values do not match up closely with the known values for many measurement samples. In addition, the best fit line 191 among the plotted sample points does not align with the ideal line 192. In this example, regression seeded by nominal values is converging to local minima.

Figure 7:
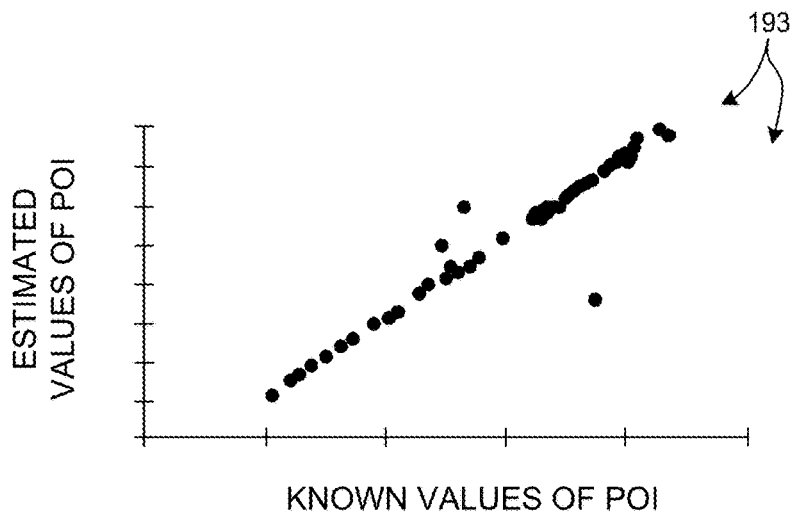
FIG. 7 depicts a plot illustrative of simulated scatterometry measurements of the complex DRAM structure depicted in FIG. 6 using forward library based seeding in one example.

FIG. 7 depicts a plot 193 of simulated scatterometry measurements of the complex DRAM structure depicted in FIG. 6 using forward library based seeding as described herein. The measured image data are the same as FIG. 6, however, the estimated values of the parameter of interest are calculated based on regression on the simulated measured image data using the set of seed parameter values associated with the lowest valued error metric as described hereinbefore. As depicted in FIG. 7, the estimated values match up closely with the known values for all but three measurement samples.

Figure 8:
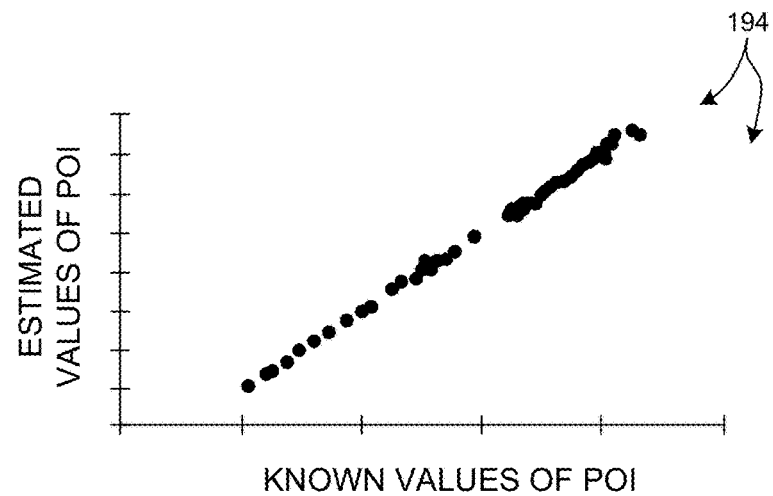
FIG. 8 depicts a plot illustrative of simulated scatterometry measurements of the complex DRAM structure depicted in FIG. 6 using forward library based seeding in another example.

FIG. 8 depicts a plot 194 of simulated scatterometry measurements of the complex DRAM structure depicted in FIG. 6 using forward library based seeding as described herein. The measured image data are the same as FIG. 6, however, the estimated values of the parameter of interest are calculated based on regression on the simulated measured image data using the set of seed parameter values associated with the lowest valued error metric and the set of seed parameter values having the greatest Euclidean distance from the selected set of seed parameter values associated with the lowest valued error metric as described hereinbefore. As depicted in FIG. 8, the estimated values match up closely with the known values for all measurement samples.

Figure 9:
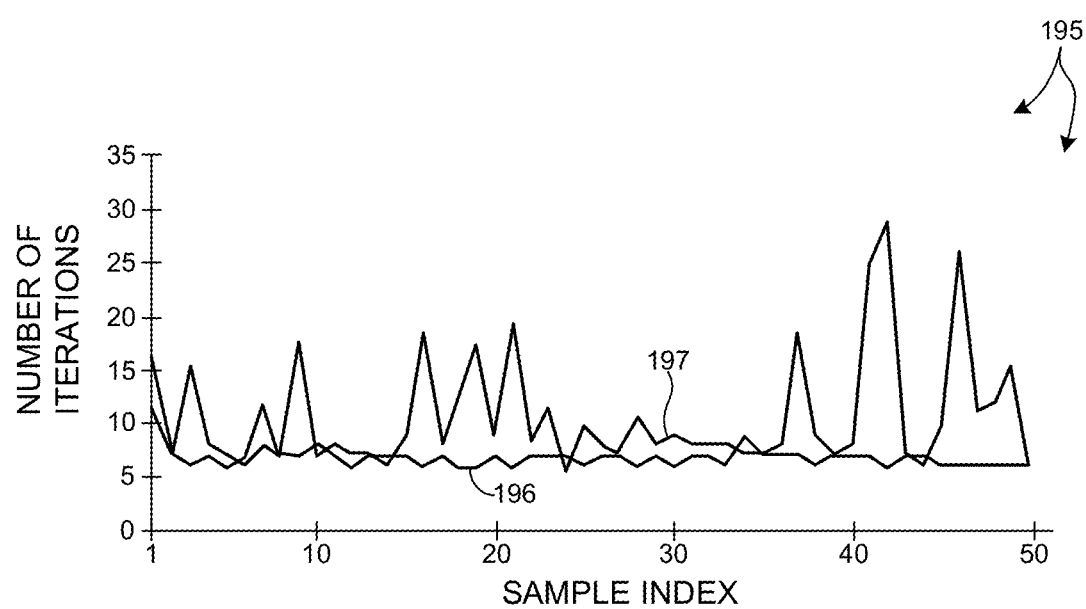
FIG. 9 depicts a plot illustrative of the number of regression iterations required to converge on a solution for each of the measurement samples depicted in FIG. 6 and FIG. 7.

FIG. 9 depicts a plot 195 illustrative of the number of regression iterations required to converge on a solution for each of the measurement samples depicted in FIG. 6 and FIG. 7. Plotline 197 depicts the number of regression iterations required to converge on a solution for each of the measurement samples depicted in FIG. 6. Similarly, plotline 196 depicts the number of regression iterations required to converge on a solution for each of the measurement samples depicted in FIG. 7. The regressions associated with FIGS. 6 and 7 are on the same simulated measured data set. However, the regressions associated with FIG. 6 are seeded with nominal values and the regressions associated with FIG. 7 are seeded in accordance with forward library based seeding as described herein. As illustrated in FIG. 9, for almost all measurement samples, the number of iterations associated with seeding using nominal values is much higher than the number of iterations required when forward library based seeding is employed. The reduced number of iterations results in reduced computational effort.

In general, forward library based seeding leverages the speed advantage of a pre-computed parameter-efficiency library and performs regression on order efficiencies, rather than images. Forward library based seeding enables regression from nearest neighbors in efficiency space to find the global minimum on the forward library approximated cost surface. This greatly increases the possibility that subsequent image based regression converges to global minima. Furthermore, forward library based seeding offers the possibility of multiple, different sets of seed values that also increases the possibility that subsequent image based regression converges to global minima based on one of the sets of seed values.

In a further aspect, the pre-generated parameter-efficiency library 170 is compressed by a data reduction algorithm such as a principle component analysis (PCA). The compressed library reduces the dimensionality of order efficiencies. Operating in a compressed efficiency space reduces the computational effort associated with searching for candidate parameter-efficiency pairs and regression. By compressing the efficiency space, a broader efficiency space may be utilized.

In another further aspect, order efficiencies are encoded to integers to increase search speed.

In another further aspect, efficiency values of a set of estimated diffraction order efficiency values are weighted differently. In recognition of the fact that some efficiency orders are more important than others, it may be advantageous to weigh efficiency values differently to improve seeding accuracy. In some examples, the weighting factors are derived from a signal to noise ratio associated with each diffraction order. In some other examples, the weighting factors are based on sensitivity to values of critical parameters. In some other examples, the weighting factors are based on the accuracy of the transformation of the measured image to diffraction order efficiencies.

Figure 17:
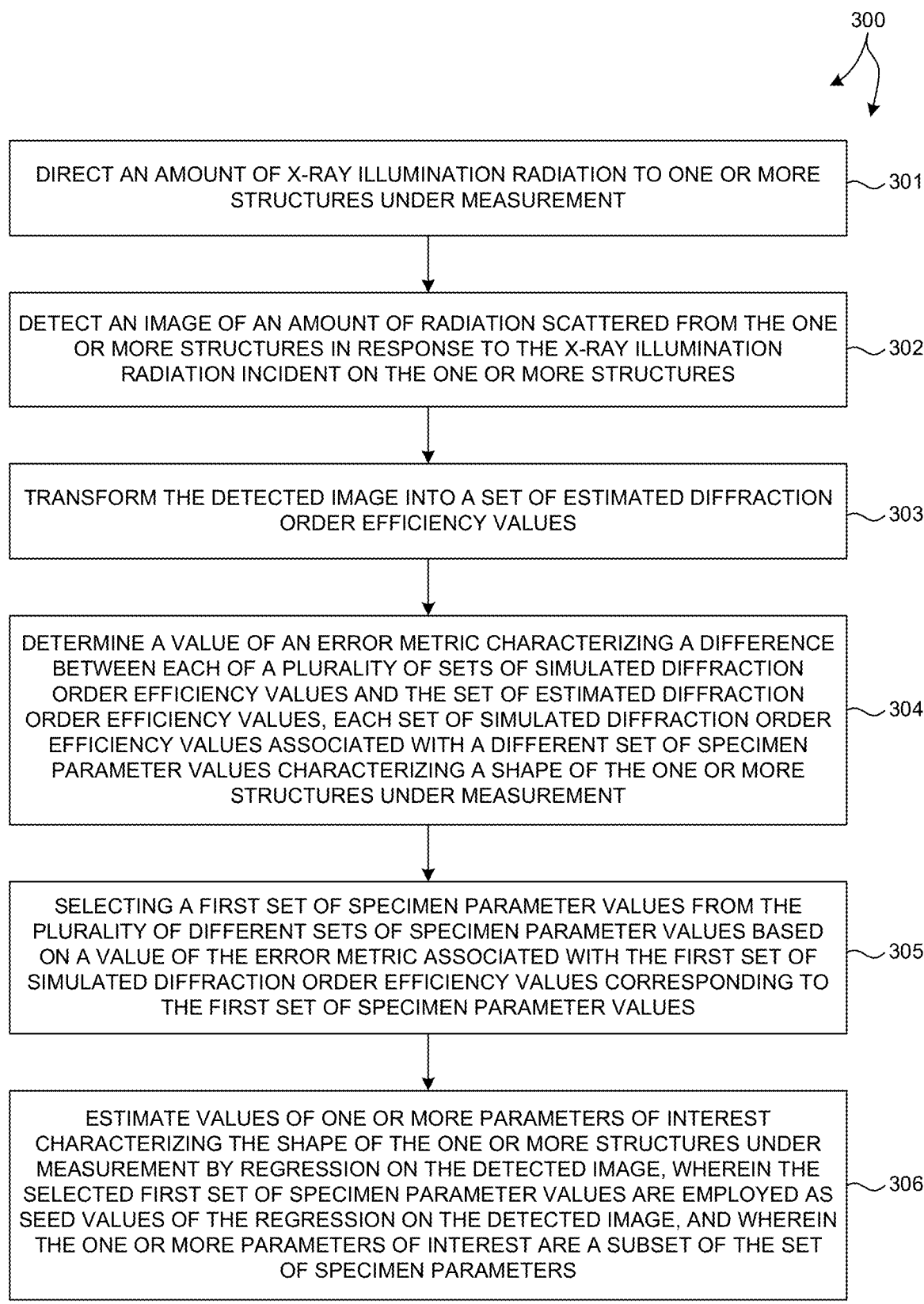
FIG. 17 depicts a flowchart illustrative of an exemplary method 300 of performing scatterometry based measurements using forward library based seeding as described herein.

FIG. 17 illustrates a method 300 suitable for implementation by the metrology systems 100 and 200 of the present invention. In one aspect, it is recognized that data processing blocks of method 300 may be carried out via a pre-programmed algorithm executed by one or more processors of computing system 130. While the following description is presented in the context of metrology systems 100 and 200, it is recognized herein that the particular structural aspects of metrology systems 100 and 200 do not represent limitations and should be interpreted as illustrative only.

In block 301, an amount of x-ray illumination radiation is directed to one or more structures under measurement.

In block 302, an image of an amount of radiation scattered from the one or more structures is detected in response to the x-ray illumination radiation incident on the one or more structures.

In block 303, the detected image is transformed into a set of estimated diffraction order efficiency values.

In block 304, a value of an error metric characterizing a difference between each of a plurality of sets of simulated diffraction order efficiency values and the set of estimated diffraction order efficiency values is determined. Each set of simulated diffraction order efficiency values is associated with a different set of specimen parameter values. The specimen parameter values characterize a shape of the one or more structures under measurement.

In block 305, a first set of specimen parameter values is selected from the plurality of different sets of specimen parameter values based on a value of the error metric associated with the first set of simulated diffraction order efficiency values corresponding to the first set of specimen parameter values.

In block 306, values of one or more parameters of interest characterizing the shape of the one or more structures under measurement are estimated by regression on the detected image. The selected first set of specimen parameter values are employed as seed values of the regression on the detected image. The one or more parameters of interest are a subset of the set of specimen parameters.

X-ray based measurements of semiconductor structures as described herein may be performed on any number of different metrology systems, such as, but not limited to, x-ray transmission tools, x-ray reflection tools, infrared transmission tools, etc.

In a further aspect, x-ray scatterometry measurements are performed in accordance with a measurement recipe including a range of angles of incidence that provide sufficient resolution and depth of penetration to characterize high aspect ratio structures through their entire depth.

In a further aspect, a measurement recipe is implemented on a metrology system by communicating control commands that result in changes in state of one or more elements of the metrology system to implement the optimized measurement recipe.

In some examples, the control commands are provided to the illumination source. In response, the electrical state of the illumination source is adjusted to change the scanned spot size and shape, illumination power, spot offsets, incident angles, etc.

In some examples, the control commands are provided to one or more positioning devices that control the location of one or more optical elements of the metrology system. In response, the one or more positioning devices changes a position/orientation of one or more optical elements to adjust the incidence angles, focal distance between the illumination source and illumination optics, beam positioning, location of the beam spot on the optic to minimize the effects of surface roughness, etc.

Metrology systems and techniques are employed to measure structural and material characteristics associated with different semiconductor fabrication processes. In some examples, x-ray scatterometry measurements are performed to estimate values of critical dimensions, thicknesses, overlay, and material properties of high aspect ratio semiconductor structures including, but not limited to, spin transfer torque random access memory (STT-RAM), three dimensional NAND memory (3D-NAND) or vertical NAND memory (V-NAND), dynamic random access memory (DRAM), three dimensional FLASH memory (3D-FLASH), resistive random access memory (Re-RAM), and phase change random access memory (PC-RAM).

In some embodiments, x-ray detector 116 is maintained in the same atmospheric environment as specimen 101 (e.g., gas purge environment). However, in some embodiments, the distance between specimen 101 and x-ray detector 116 is lengthy and environmental disturbances (e.g., air turbulence) contribute noise to the detected signals. Hence in some embodiments, one or more of the x-ray detectors is maintained in a localized, vacuum environment separated from the specimen (e.g., specimen 101) by a vacuum window.

Similarly, in some embodiments, x-ray illumination source 110, illumination optics 115, or both, are maintained in the same atmospheric environment as specimen 101 (e.g., gas purge environment). However, in some embodiments, the optical path length between x-ray illumination source 110 and illumination optics 115 and the optical path length between illumination optics 115 and specimen 101 are long and environmental disturbances (e.g., air turbulence) contribute noise to the illumination beam. Hence in some embodiments, the x-ray illumination source, the illumination optics 115, or both, are maintained in a localized, vacuum environment separated from the specimen (e.g., specimen 101) by a vacuum window.

In some embodiments, the entire optical system, including specimen 101, is maintained in vacuum. However, in general, the costs associated with maintaining specimen 101 in vacuum are high due to the complexities associated with the construction of specimen positioning system 140.

In some embodiments, the metrology target characterized by x-ray scatterometry measurements as described herein is located within a scribe line of the wafer under measurement. In these embodiments, the metrology target is sized to fit within the width of the scribe line. In some examples, the scribe line width is less than eighty micrometers. In some examples, the scribe line is less than fifty micrometers. In general, the width of the scribe lines employed in semiconductor manufacturing is trending smaller.

In some embodiments, the metrology target characterized x-ray scatterometry measurements as described herein is located within an active die area of the wafer under measurement and is a part of a functional integrated circuit (e.g., memory, image sensor, logic device, etc.).

In general, a metrology target is characterized by an aspect ratio defined as a maximum height dimension (i.e., dimension normal to the wafer surface) divided by a maximum lateral extent dimension (i.e., dimension aligned with the wafer surface) of the metrology target. In some embodiments, the metrology target under measurement has an aspect ratio of at least twenty. In some embodiments, the metrology target has an aspect ratio of at least forty.

Figure 16A:
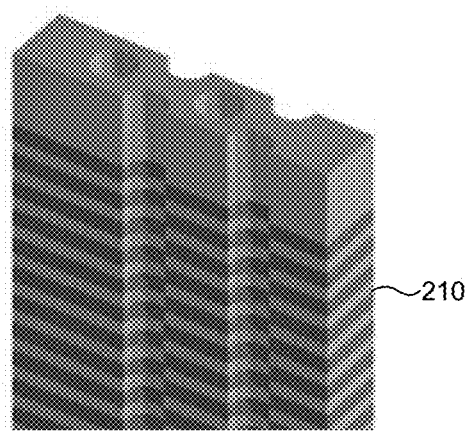
FIGS. 16A-16C depict an isometric view, a top view, and a cross-sectional view, respectively, of a typical 3D FLASH memory device 210 subject to measurement in the manner described herein.
Figure 16B:
Figure 16C:
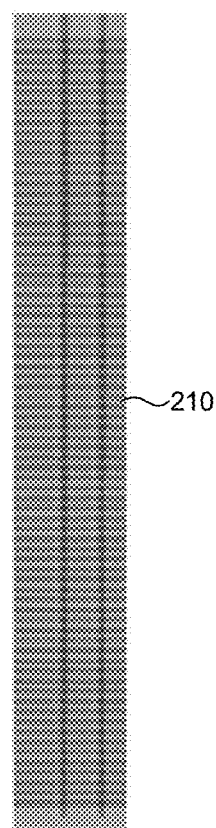

FIGS. 16A-16C depict an isometric view, a top view, and a cross-sectional view, respectively, of a typical 3D FLASH memory device 210 subject to measurement in the manner described herein. The total height (or equivalently depth) of memory device 210 ranges from one to several micrometers. Memory device 210 is a vertically manufactured device. A vertically manufactured device, such as memory device 210, essentially turns a conventional, planar memory device 90 degrees, orienting the bit line and cell string vertically (perpendicular to wafer surface). To provide sufficient memory capacity, a large number of alternating layers of different materials are deposited on the wafer. This requires patterning processes to perform well to depths of several microns for structures with a maximum lateral extent of one hundred nanometers or less. As a result, aspect ratios of 25 to 1 or 50 to 1 are not uncommon.

In general, the use of high brightness, x-ray scatterometry enables high flux x-ray radiation penetration into opaque areas of the target. Examples of measureable geometric parameters using x-ray scatterometry includes pore size, pore density, line edge roughness, line width roughness, side wall angle, profile, critical dimension, overlay, edge placement error, and pitch. An example of a measureable material parameter includes electron density. In some examples, x-ray scatterometry enables the measurement of features smaller than 10 nm as well as advanced semiconductor structures such as STT-RAM, V-NAND, DRAM, PC-RAM and Re-RAM, where measurements of geometrical parameters and material parameters are needed.

It should be recognized that the various steps described throughout the present disclosure may be carried out by a single computer system 130 or, alternatively, a multiple computer system 130. Moreover, different subsystems of the system 100, such as the specimen positioning system 140, may include a computer system suitable for carrying out at least a portion of the steps described herein. Therefore, the aforementioned description should not be interpreted as a limitation on the present invention but merely an illustration. Further, the one or more computing systems 130 may be configured to perform any other step(s) of any of the method embodiments described herein.

In addition, the computer system 130 may be communicatively coupled to the detector 116 and the illumination optics 115 in any manner known in the art. For example, the one or more computing systems 130 may be coupled to computing systems associated with the detector 116 and the illumination optics 115, respectively. In another example, any of the detector 116 and the illumination optics 115 may be controlled directly by a single computer system coupled to computer system 130.

The computer system 130 may be configured to receive and/or acquire data or information from the subsystems of the system (e.g., detector 116 and illumination optics 115, and the like) by a transmission medium that may include wireline and/or wireless portions. In this manner, the transmission medium may serve as a data link between the computer system 130 and other subsystems of the system 100.

Computer system 130 of the metrology system 100 may be configured to receive and/or acquire data or information (e.g., measurement results, modeling inputs, modeling results, etc.) from other systems by a transmission medium that may include wireline and/or wireless portions. In this manner, the transmission medium may serve as a data link between the computer system 130 and other systems (e.g., memory on-board metrology system 100, external memory, or external systems). For example, the computing system 130 may be configured to receive measurement data (e.g., signals 126) from a storage medium (i.e., memory 132 or 400) via a data link. For instance, image results obtained using detector 116 may be stored in a permanent or semi-permanent memory device (e.g., memory 132 or 400). In this regard, the measurement results may be imported from on-board memory or from an external memory system. Moreover, the computer system 130 may send data to other systems via a transmission medium. For instance, specimen parameter values 170 determined by computer system 130 may be stored in a permanent or semi-permanent memory device (e.g., memory 400). In this regard, measurement results may be exported to another system.

Computing system 130 may include, but is not limited to, a personal computer system, mainframe computer system, workstation, image computer, cloud based computing system, parallel processor, or any other device known in the art. In general, the term "computing system" may be broadly defined to encompass any device having one or more processors, which execute instructions from a memory medium.

Program instructions 134 implementing methods such as those described herein may be transmitted over a transmission medium such as a wire, cable, or wireless transmission link. For example, as illustrated in FIG. 1, program instructions stored in memory 132 are transmitted to processor 131 over bus 133. Program instructions 134 are stored in a computer readable medium (e.g., memory 132). Exemplary computer-readable media include read-only memory, a random access memory, a magnetic or optical disk, or a magnetic tape.

In some embodiments, x-ray scatterometry measurements as described herein are implemented as part of a fabrication process tool. Examples of fabrication process tools include, but are not limited to, lithographic exposure tools, film deposition tools, implant tools, and etch tools. In this manner, the results of a measurement are used to control a fabrication process. In one example, x-ray scatterometry measurement data collected from one or more targets is sent to a fabrication process tool. The x-ray scatterometry measurement data is analyzed as described herein and the results used to adjust the operation of the fabrication process tool.

Scatterometry measurements as described herein may be used to determine characteristics of a variety of semiconductor structures. Exemplary structures include, but are not limited to, FinFETs, low-dimensional structures such as nanowires or graphene, sub 10 nm structures, lithographic structures, through substrate vias (TSVs), memory structures such as DRAM, DRAM 4F2, FLASH, MRAM and high aspect ratio memory structures. Exemplary structural characteristics include, but are not limited to, geometric parameters such as line edge roughness, line width roughness, pore size, pore density, side wall angle, profile, critical dimension, pitch, and material parameters such as electron density, composition, grain structure, morphology, stress, strain, and elemental identification.

As described herein, the term "critical dimension" includes any critical dimension of a structure (e.g., bottom critical dimension, middle critical dimension, top critical dimension, sidewall angle, grating height, etc.), a critical dimension between any two or more structures (e.g., distance between two structures), and a displacement between two or more structures (e.g., overlay displacement between overlaying grating structures, etc.). Structures may include three dimensional structures, patterned structures, overlay structures, etc.

As described herein, the term "critical dimension application" or "critical dimension measurement application" includes any critical dimension measurement.

As described herein, the term "metrology system" includes any system employed at least in part to characterize a specimen in any aspect, including measurement applications such as critical dimension metrology, overlay metrology, focus/dosage metrology, and composition metrology. However, such terms of art do not limit the scope of the term "metrology system" as described herein. In addition, the system 100 may be configured for measurement of patterned wafers and/or unpatterned wafers. The metrology system may be configured as a LED inspection tool, edge inspection tool, backside inspection tool, macro-inspection tool, or multi-mode inspection tool (involving data from one or more platforms simultaneously), and any other metrology or inspection tool that benefits from the calibration of system parameters based on critical dimension data.

Various embodiments are described herein for a semiconductor measurement system that may be used for measuring a specimen within any semiconductor processing tool (e.g., an inspection system or a lithography system). The term "specimen" is used herein to refer to a wafer, a reticle, or any other sample that may be processed (e.g., printed or inspected for defects) by means known in the art.

As used herein, the term "wafer" generally refers to substrates formed of a semiconductor or non-semiconductor material. Examples include, but are not limited to, monocrystalline silicon, gallium arsenide, and indium phosphide. Such substrates may be commonly found and/or processed in semiconductor fabrication facilities. In some cases, a wafer may include only the substrate (i.e., bare wafer). Alternatively, a wafer may include one or more layers of different materials formed upon a substrate. One or more layers formed on a wafer may be "patterned" or "unpatterned." For example, a wafer may include a plurality of dies having repeatable pattern features.

A "reticle" may be a reticle at any stage of a reticle fabrication process, or a completed reticle that may or may not be released for use in a semiconductor fabrication facility. A reticle, or a "mask," is generally defined as a substantially transparent substrate having substantially opaque regions formed thereon and configured in a pattern. The substrate may include, for example, a glass material such as amorphous $SiO_2$. A reticle may be disposed above a resist-covered wafer during an exposure step of a lithography process such that the pattern on the reticle may be transferred to the resist.

One or more layers formed on a wafer may be patterned or unpatterned. For example, a wafer may include a plurality of dies, each having repeatable pattern features. Formation and processing of such layers of material may ultimately result in completed devices. Many different types of devices may be formed on a wafer, and the term wafer as used herein is intended to encompass a wafer on which any type of device known in the art is being fabricated.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A metrology system comprising:
an x-ray illumination source configured to generate an amount of x-ray illumination radiation directed to one or more semiconductor structures under measurement formed on a wafer surface;
an x-ray detector configured to detect an image of an amount of radiation scattered from the one or more structures in response to the x-ray illumination radiation incident on the one or more structures; and
a computing system configured to:
transform the image detected at the x-ray detector into a set of estimated diffraction order efficiency values;
determine a value of an error metric characterizing a difference between each of a plurality of sets of simulated diffraction order efficiency values and the set of estimated diffraction order efficiency values, each set of simulated diffraction order efficiency values associated with a different set of specimen parameter values characterizing a shape of the one or more structures under measurement;
select a first set of specimen parameter values from the plurality of different sets of specimen parameter values based on a value of the error metric associated with the first set of simulated diffraction order efficiency values corresponding to the first set of specimen parameter values; and
estimate values of one or more parameters of interest characterizing the shape of the one or more structures under measurement by regression on the detected image, wherein the selected first set of specimen parameter values are employed as seed values of the regression on the detected image, and wherein the one or more parameters of interest are a subset of the set of specimen parameters.

2. The metrology system of claim 1, wherein the error metric includes a regularization term.

3. The metrology system of claim 1, wherein the error metric is a single error metric or a combination of different error metrics.

4. The metrology system of claim 1, wherein the selecting of the first set of specimen parameter values involves a clustering algorithm.

5. The metrology system of claim 1, wherein the value of the error metric associated with the first set of simulated diffraction order efficiency values is the smallest value among the error metric values associated with each of the plurality of sets of simulated diffraction order efficiency values.

6. The metrology system of claim 1, the computing system further configured to:
select a second set of specimen parameter values from the plurality of different sets of specimen parameter values based on a Euclidean distance between the first set of specimen parameter values and the second set of specimen parameter values.

7. The metrology system of claim 1, the computing system further configured to:
estimate a value indicative of a signal to noise ratio associated with each of the set of diffraction order efficiency values; and
filter the set of diffraction order efficiency values based on the estimated values indicative of the signal to noise ratio.

8. The metrology system of claim 1, the computing system further configured to:
determine a statistical distribution of the error metric values associated with each of the plurality of sets of simulated diffraction order efficiency values; and
filter the plurality of sets of simulated diffraction order efficiency values based on a location of the value of the error metric associated with each of the plurality of sets of simulated diffraction order efficiency values within the statistical distribution.

9. The metrology system of claim 1, the computing system further configured to:
determine a refined, first set of specimen parameter values based on a regression on the first set of simulated diffraction order efficiency values, wherein the first set of specimen parameter values are employed as seed values of the regression on the first set of simulated diffraction order efficiency values, and wherein the refined, first set of specimen parameter values are employed as seed values of the regression on the detected image.

10. The metrology system of claim 1, wherein the transforming of the image detected at the x-ray detector into the set of estimated diffraction order efficiency values involves a trained, machine-learning based model.

11. The metrology system of claim 1, wherein the transforming of the image detected at the x-ray detector into the set of estimated diffraction order efficiency values involves a linear model.

12. The metrology system of claim 1, wherein the error metric includes a variance term associated with repeated measurement instances.

13. The metrology system of claim 1, wherein the error metric includes a smoothness term associated with measurement instances at different locations across the wafer surface.

14. The metrology system of claim 1, wherein the set of estimated diffraction order efficiency values are weighted differently.

15. A method comprising:
directing an amount of x-ray illumination radiation to one or more structures under measurement;
detecting an image of an amount of radiation scattered from the one or more structures in response to the x-ray illumination radiation incident on the one or more structures;
transforming the detected image into a set of estimated diffraction order efficiency values;
determining a value of an error metric characterizing a difference between each of a plurality of sets of simulated diffraction order efficiency values and the set of estimated diffraction order efficiency values, each set of simulated diffraction order efficiency values associated with a different set of specimen parameter values characterizing a shape of the one or more structures under measurement;
selecting a first set of specimen parameter values from the plurality of different sets of specimen parameter values based on a value of the error metric associated with the first set of simulated diffraction order efficiency values corresponding to the first set of specimen parameter values; and
estimating values of one or more parameters of interest characterizing the shape of the one or more structures under measurement by regression on the detected image, wherein the selected first set of specimen parameter values are employed as seed values of the regression on the detected image, and wherein the one or more parameters of interest are a subset of the set of specimen parameters.

16. The method of claim 15, further comprising:
selecting a second set of specimen parameter values from the plurality of different sets of specimen parameter values based on a Euclidean distance between the first set of specimen parameter values and the second set of specimen parameter values.

17. The method of claim 15, further comprising:
estimating a value indicative of a signal to noise ratio associated with each of the set of diffraction order efficiency values; and
filtering the set of diffraction order efficiency values based on the estimated values indicative of the signal to noise ratio.

18. The method of claim 15, further comprising:
determining a statistical distribution of the error metric values associated with each of the plurality of sets of simulated diffraction order efficiency values; and
filtering the plurality of sets of simulated diffraction order efficiency values based on a location of the value of the error metric associated with each of the plurality of sets of simulated diffraction order efficiency values within the statistical distribution.

19. The method of claim 15, further comprising:
determining a refined, first set of specimen parameter values based on a regression on the first set of simulated diffraction order efficiency values, wherein the first set of specimen parameter values are employed as seed values of the regression on the first set of simulated diffraction order efficiency values, and wherein the refined, first set of specimen parameter values are employed as seed values of the regression on the detected image.

20. A metrology system comprising:

an x-ray illumination source configured to generate an amount of x-ray illumination radiation directed to one or more semiconductor structures under measurement formed on a wafer surface;

an x-ray detector configured to detect an image of an amount of radiation scattered from the one or more structures in response to the x-ray illumination radiation incident on the one or more structures; and a non-transitory, computer-readable medium including instructions that when executed by one or more processors of a computing system cause the computing system to:

transform the image detected at the x-ray detector into a set of estimated diffraction order efficiency values;

determine a value of an error metric characterizing a difference between each of a plurality of sets of simulated diffraction order efficiency values and the set of estimated diffraction order efficiency values, each set of simulated diffraction order efficiency values associated with a different set of specimen parameter values characterizing a shape of the one or more structures under measurement;

select a first set of specimen parameter values from the plurality of different sets of specimen parameter values based on a value of the error metric associated with the first set of simulated diffraction order efficiency values corresponding to the first set of specimen parameter values; and estimate values of one or more parameters of interest characterizing the shape of the one or more structures under measurement by regression on the detected image, wherein the selected first set of specimen parameter values are employed as seed values of the regression on the detected image, and wherein the one or more parameters of interest are a subset of the set of specimen parameters.

* * * * *